(12) United States Patent
Heine et al.

(10) Patent No.: US 12,286,916 B2
(45) Date of Patent: Apr. 29, 2025

(54) SYSTEMS AND METHODS FOR HEATING A HONEYCOMB BODY

(71) Applicant: CORNING INCORPORATED, Corning, NY (US)

(72) Inventors: David Robert Heine, Hammondsport, NY (US); Avinash Tukaram Shinde, Pune (IN)

(73) Assignee: Corning Incorporated, Corning, NY (US)

( * ) Notice: Subject to any disclaimer, the term of this patent is extended or adjusted under 35 U.S.C. 154(b) by 333 days.

(21) Appl. No.: 17/770,159

(22) PCT Filed: Oct. 26, 2020

(86) PCT No.: PCT/US2020/057277
§ 371 (c)(1),
(2) Date: Apr. 19, 2022

(87) PCT Pub. No.: WO2021/086765
PCT Pub. Date: May 6, 2021

(65) Prior Publication Data
US 2022/0389850 A1 Dec. 8, 2022

Related U.S. Application Data

(60) Provisional application No. 62/927,460, filed on Oct. 29, 2019.

(51) Int. Cl.
*F01N 3/027* (2006.01)
*F01N 3/20* (2006.01)
*F01N 9/00* (2006.01)

(52) U.S. Cl.
CPC .......... *F01N 3/027* (2013.01); *F01N 3/2026* (2013.01); *F01N 9/00* (2013.01); *F01N 2240/16* (2013.01); *F01N 2900/1602* (2013.01)

(58) Field of Classification Search
CPC .......... F01N 3/027; F01N 3/2026; F01N 9/00; F01N 2240/16; F01N 2900/1602;
(Continued)

(56) References Cited

U.S. PATENT DOCUMENTS 5,259,190 A * 11/1993 Bagley ............... B01D 46/2425
422/174
5,449,541 A 9/1995 Lipp et al.
(Continued)

FOREIGN PATENT DOCUMENTS

EP 3282105 A1 2/2018
JP 5261256 B2 8/2013
(Continued)

OTHER PUBLICATIONS

European Patent Application No. 20807980.6, Communication pursuant to article 94(3) EPC, dated May 24, 2023; 6 pages; European Patent Office.
(Continued)

*Primary Examiner* — Matthew T Largi
(74) *Attorney, Agent, or Firm* — Kurt R. Denniston

(57) ABSTRACT

An electrical heater and method for heating a catalyst. The electrical heater includes a honeycomb body having a central axis extending longitudinally therethrough. The honeycomb body includes a matrix of intersecting walls forming a plurality of cells extending axially through the honeycomb body. A plurality of electrodes are positioned about an outer periphery of the honeycomb body. The plurality of electrodes are arranged into a plurality of pairs of electrodes that comprises at least a first pair of electrodes and a second pair of electrodes. Each pair of electrodes includes a first electrode and a second electrode. An electrode length of the
(Continued)

electrodes along the outer periphery is proportional to a central current path length between center points of the electrodes of that pair of electrode. The electrode lengths of the electrodes of the first and second pairs of electrode are different.

16 Claims, 28 Drawing Sheets

(58) Field of Classification Search
CPC ...... H05B 2203/024; H05B 3/42; H05B 3/00; H05B 1/02; H05B 3/03
See application file for complete search history.

(56) References Cited

U.S. PATENT DOCUMENTS

| | | | |
|---|---|---|---|
| 5,651,088 A | 7/1997 | Abe et al. | |
| 8,604,811 B2 | 12/2013 | Kawase et al. | |
| 9,885,271 B2 | 2/2018 | Omiya et al. | |
| 10,648,388 B2 * | 5/2020 | Takeuchi | G01N 27/4077 |
| 10,677,126 B2 * | 6/2020 | Schlipf | H05B 3/48 |
| 2011/0305601 A1 * | 12/2011 | Kawase | F01N 3/2026 422/109 |
| 2012/0076698 A1 * | 3/2012 | Ishihara | F01N 3/2026 422/174 |
| 2013/0045137 A1 * | 2/2013 | Sakashita | H05B 3/16 422/174 |
| 2013/0224080 A1 * | 8/2013 | Ishihara | H05B 3/06 422/174 |
| 2014/0296054 A1 * | 10/2014 | Kikuchi | C04B 37/005 502/1 |
| 2018/0073414 A1 * | 3/2018 | Imada | F01N 3/0275 |

FOREIGN PATENT DOCUMENTS

| | | |
|---|---|---|
| JP | 2017-031829 A | 2/2017 |
| JP | 6244264 B2 | 12/2017 |

OTHER PUBLICATIONS

International Search Report and Written Opinion of the International Searching Authority; PCT/US2020/057277; Mailed Jan. 27, 2021; 10 Pages; European Patent Office.

* cited by examiner

SYSTEMS AND METHODS FOR HEATING A HONEYCOMB BODY

CROSS REFERENCE TO RELATED APPLICATION

This is a national stage application under 35 U.S.C. § 371 of International Application No. PCT/US2020/057277, filed on Oct. 26, 2020, which claims the benefit of priority under 35 U.S.C § 120 of U.S. Provisional Application Ser. No. 62/927,460 filed on Oct. 29, 2019, the content of which is relied upon and incorporated herein by reference in their entireties.

BACKGROUND

This application generally relates to electrical heaters for heating a catalyst, such as a catalyst on a substrate of a catalytic converter assembly and more specifically, electrical heaters comprising a honeycomb body and electrodes configured to generate a desired heating profile across an end face of the honeycomb body.

SUMMARY

All examples and features mentioned below can be combined in any technically possible way.

In one aspect, an electrical heater is provided. The electrical comprises a honeycomb body having a central axis extending longitudinally therethrough, the honeycomb body comprising a matrix of intersecting walls forming a plurality of cells extending axially through the honeycomb body; a plurality of electrodes positioned about an outer periphery of the honeycomb body, the plurality of electrodes being arranged into a plurality of pairs of electrodes that comprises at least a first pair of electrodes and a second pair of electrodes, each pair of electrodes comprising a first electrode and a second electrode, wherein a current produced by the electrodes of each pair flows through at least some of the intersecting walls between the electrodes of each pair of electrodes; wherein an electrode length of the electrodes of each pair of electrodes along the outer periphery is proportional to a central current path length defined as the shortest distance, through the walls, between center points of the electrodes of that pair of electrodes, and wherein the electrode length of the electrodes of the first pair of electrodes is different than the electrode length of the electrodes of the second pair of electrodes.

In some embodiments, the electrical heater further comprises a controller configured to apply a voltage between the plurality of electrodes according to a heating sequence, wherein the heating sequence comprises sequentially applying a first voltage to the first pair of electrodes and a second voltage between the second pair of electrodes.

In some embodiments, an average of the second voltage over the heating sequence is different than an average of the first voltage over the heating sequence. In some embodiments, the heating sequence is configured to generate a substantially uniform heat profile of the honeycomb body. In some embodiments, the heating sequence is configured to generate a substantially uniform heat profile of the honeycomb body when receiving an uneven gas flow across a cross-section of the honeycomb body taken transverse to the central axis. In some embodiments, the heating sequence comprises a cooling interval disposed between the applications of the voltage between the first pair of electrodes and the voltage between the second pair of electrodes.

In some embodiments, the electrical heater further comprises an interior electrode embedded within the honeycomb body, wherein the heating sequence further comprises applying a voltage between the interior electrode and at least one of the plurality of electrodes. In some embodiments, the interior electrode is disposed at the central axis.

In some embodiments, the electrical heater further comprises a plurality of insulating layers, each insulating layer extending from the outer periphery of the honeycomb body into an interior of the honeycomb body, such that current is concentrated into an interior region of the honeycomb body.

In some embodiments, the insulating layers are each a slit. In some embodiments, the insulating layers each comprises an insulating material. In some embodiments, each insulating layer extends radially toward the central axis from the outer peripherally at a location between each circumferentially adjacent pair of the electrodes. In some embodiments, the region is centered at the central axis. In some embodiments, the interior region is centered at a location of the honeycomb body off the central axis.

In some embodiments, the outer periphery of the honeycomb body is cylindrical and the cells are rectangular in cross-section.

In another aspect, an electrical heater is provided. The electrical heater comprises a honeycomb body being substantially cylindrical and having a central axis extending longitudinally therethrough, the honeycomb body comprising a matrix of intersecting walls; a plurality of electrodes being operatively positioned about an outer periphery of the honeycomb body, the plurality of electrodes being arranged into a plurality of oppositely disposed pairs of electrodes, such that at least a portion of a current induced between the electrodes of each oppositely disposed pair will flow through the central axis; and a controller configured to apply a voltage between each oppositely-disposed pair of electrodes according to a heating sequence, wherein the heating sequence comprises sequentially applying a first voltage between a first oppositely-disposed pair of the oppositely-disposed pairs of electrodes and a second voltage between a second oppositely-disposed pair of the oppositely-disposed pairs of electrodes, wherein a first average of the first voltage during the heating sequence is proportional to a first current length of a first central current path between centers of the electrodes of the first oppositely-disposed pair, wherein a second average of the second voltage during the heating sequence is proportional to a second current length of a second central current path between centers of the electrodes of the second oppositely-disposed pair, and wherein the first current path is longer than the second current path.

In some embodiments, a magnitude of the first voltage is greater than a magnitude of the second voltage. In some embodiments, the first voltage is a first pulse-width modulated signal, wherein the second voltage is a second pulse-width modulated signal, wherein a duty cycle of the first pulse-width modulated signal is greater than a duty cycle of the second pulse-width modulated signal. In some embodiments, wherein the first voltage is applied for a time period greater than a time period the second voltage is applied.

In some embodiments, the electrical heater further comprises an interior electrode embedded within the honeycomb body, wherein the heating sequence further comprises applying a voltage between the interior electrode and at least one of the plurality of electrodes.

In one aspect, a method for heating a catalyst is provided. The method comprises applying a first voltage between a first pair of electrodes and a second voltage between a second pair of electrodes, wherein the electrodes of the first and second pairs of electrodes are disposed about an outer periphery of a honeycomb body having a central axis extending longitudinally therethrough, and the honeycomb body comprising a matrix of intersecting walls forming a plurality of cells extending axially through the honeycomb body; wherein an electrode length of each of the electrodes of each pair of electrodes along the outer periphery is proportional to a central current path length defined as the shortest distance, through the walls, between center points of the electrodes of that pair of electrodes, and wherein the electrode length of the electrodes of the first pair of electrodes is different than the electrode length of the electrodes of the second pair of electrodes.

In some embodiments, applying the first voltage and the second voltage comprises sequentially applying the first voltage to the first pair of electrodes and the second voltage between the second pair of electrodes according to a heating sequence.

In some embodiments, wherein an average of the second voltage over the heating sequence is different than an average of the first voltage over the heating sequence.

In some embodiments, the method further comprises generating a substantially uniform heat profile across an end face of the honeycomb body with the heating sequence.

In some embodiments, the heating sequence comprises a cooling interval disposed between applications of the first voltage between the first pair of electrodes and the second voltage between the second pair of electrodes.

In some embodiments, the method further comprises concentrating current at an interior region that is spaced away from the outer periphery of the honeycomb body. In some embodiments, the honeycomb body comprises a plurality of electrically insulating layers that prevent current flow through sections of the walls severed by the insulating layers to concentrate the current at the interior region. In some embodiments, the honeycomb body comprises an interior electrode located proximate to the interior region and the method further comprises applying a voltage between the interior electrode and one of the electrodes of the first or second pairs of electrodes.

The details of one or more implementations are set forth in the accompanying drawings and the description below. Other features, objects, and advantages will be apparent from the description and the drawings, and from the claims.

DETAILED DESCRIPTION

Some catalytic converters rely on the heat of engine exhaust to activate the catalyst in order begin treatment of vehicle emissions. As a result, a significant proportion of total emissions in some vehicles may occur immediately after starting the vehicle, while the catalyst is still cold. Embodiments disclosed herein pertain to active heating systems and methods that use electrical heating elements to supplement the existing heat of the engine exhaust, thereby enabling catalysts to be heated to effective temperatures faster, and thereby, vehicle emissions to be further reduced, particularly after cold-start of the vehicle.

One such method for actively heating the exhaust is via an electrically heated catalyst (EHC), which raises the catalyst temperature by supplying electric power from a battery, e.g., the battery of the vehicle, to provide additional heat to the catalytic converter. Electrically heated catalyst designs, however, are affected by issues such as heating profiles that have hot and/or cold spots, which may decrease performance and the efficiency of electrical energy usage.

Figure 1:
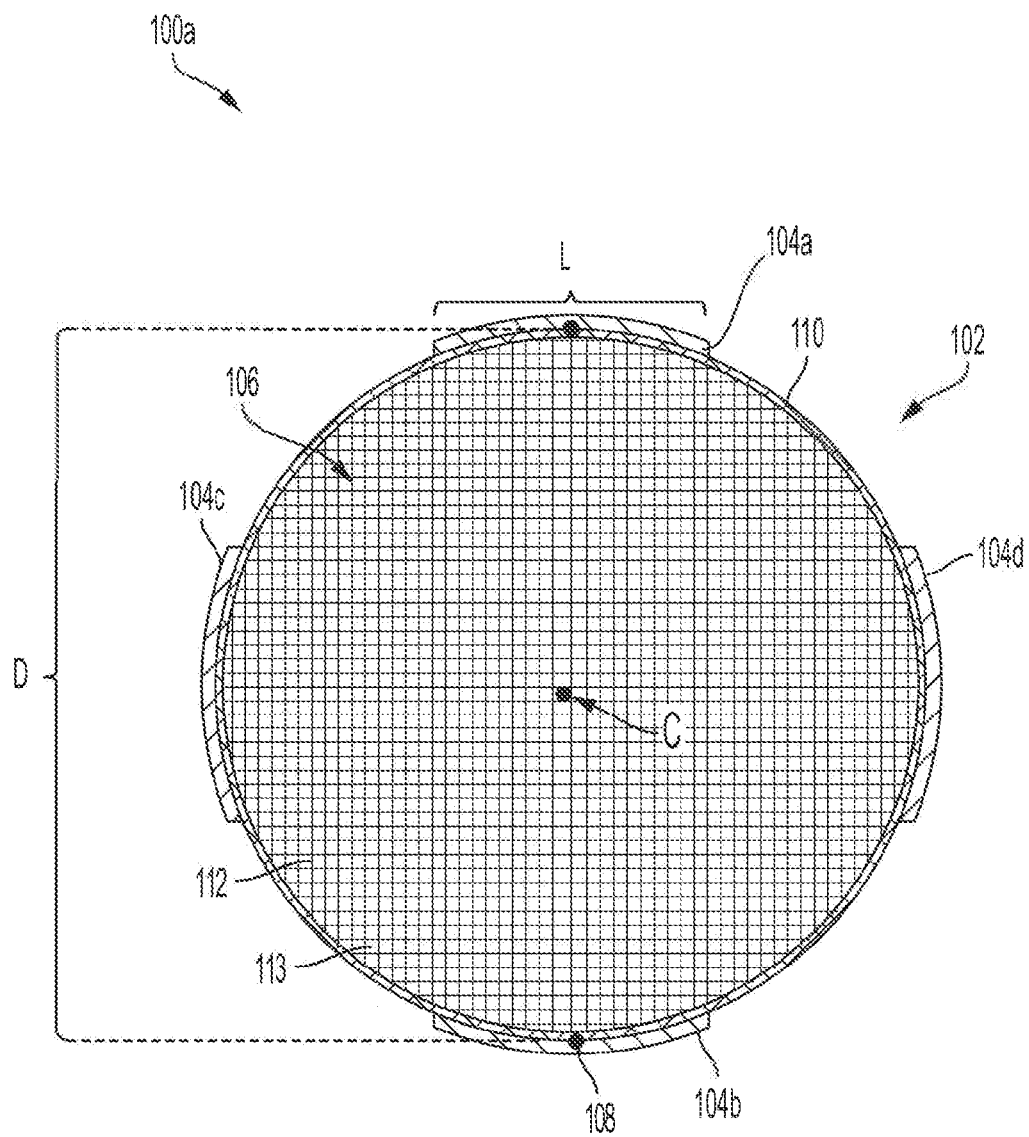
FIG. 1 depicts a cross-section of a heater for heating a catalyst, featuring multiple oppositely-disposed outer electrodes, according to an example.

There is shown in FIG. 1 a cross-sectional view of an electrical heater 100a for heating a catalyst, comprising a honeycomb body 102 about which a plurality of outer electrodes 104 are disposed. Two or more of the electrodes 104 can be connected to each other and to a power source, such as a battery, e.g., the battery of a vehicle in which the heater 100a is installed. The honeycomb body 102 comprises a honeycomb structure 106 and a skin 110. As shown more clearly in FIG. 2, the honeycomb structure 106 comprises a matrix of intersecting walls 112 that define a plurality of contiguous cells 113. The honeycomb body 102 comprises a central axis C that extends longitudinally therethrough. The walls 112 comprise an electrically conductive material such that an electric potential applied across the electrodes 104 (e.g., via a battery) will produce a flow of electrical current through at least portions of the walls 112 that connect between the electrified electrodes. As shown in FIG. 1, the honeycomb body 102 can be substantially cylindrical in shape, although the honeycomb body can have other shapes such as elliptical, rectangular, triangular, etc.

The heater 100a is provided as one particular example for a heater 100 according to the current disclosure. Other particular examples for the heater 100 are described herein with different alphabetic suffixes (e.g., a, b, etc.). Any description of the heater 100 shall apply generally to other heaters described herein sharing the base numeral 100, but appended with these different alphabetic suffixes. Likewise, the general description of other articles, assemblies, or systems herein shall be applicable to other articles, assemblies, or systems that share the same base reference numeral appended by an alphabetic suffix (e.g., the description of electrodes 104 shall be generally applicable to electrodes 104a, 104b, 104c, 104d, etc.). Additionally, unless specifically noted or preempted by further description of any particular example, the description of any example of an article, assembly, or system, shall be generally applicable to other articles, assemblies, or systems sharing the same base numeral, regardless of alphabetic suffix.

Figure 2:
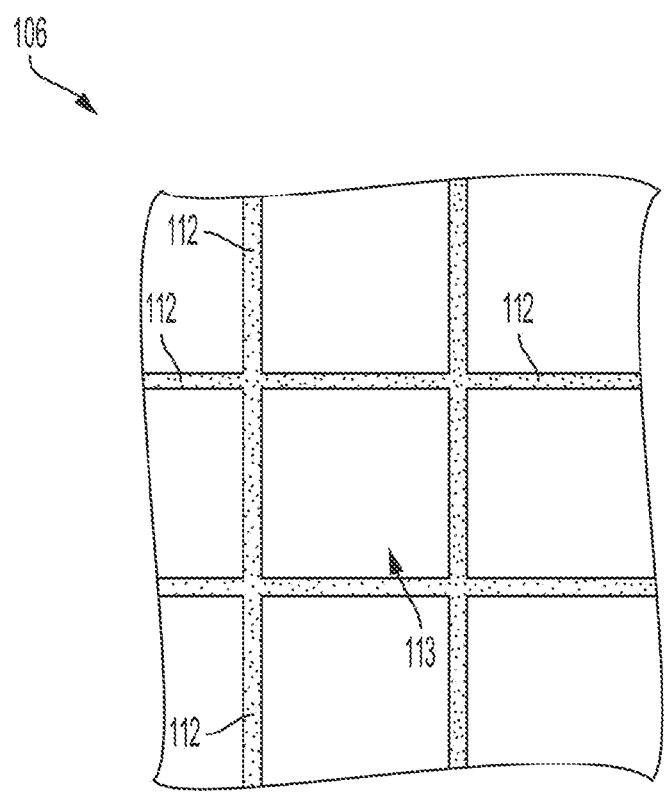
FIG. 2 is an enlarged view of a partial cross-section of a honeycomb structure, according to an example.

A portion of the honeycomb structure 106 is shown in more detail in FIG. 2. The cells 113, in cross-section (i.e., in and/or parallel to the plane of FIG. 1), can be formed of any suitable shape, including, for example, square, rectangular, triangular, or hexagonal. The walls 112 can be comprised of an electrically conductive material, such as a metal, conductive ceramic, metal-doped ceramic, or combination thereof. The intersecting walls 112 are configured to carry current flowing between the plurality of outer electrodes 104. The intersecting walls 112 can have an electrical resistivity such that they generate heat in response to the amount of current as a result of an applied voltage.

The honeycomb body 102 can be formed, for example, by extrusion of a ceramic forming material through an extrusion die as a green body, which is then cut, dried, and fired into a final ceramic honeycomb body. Alternatively, the honeycomb body 102 can be formed by an additive machining operation (e.g., such as three-dimensional printing) or subtractive machining operation (e.g., electrical discharge machining, electrochemical machining, etc.). If a ceramic material is selected that is too resistive to provide effective resistive heating, the ceramic material can be doped with a conductor, such as metal, to increase the conductivity of the ceramic.

Figure 3:
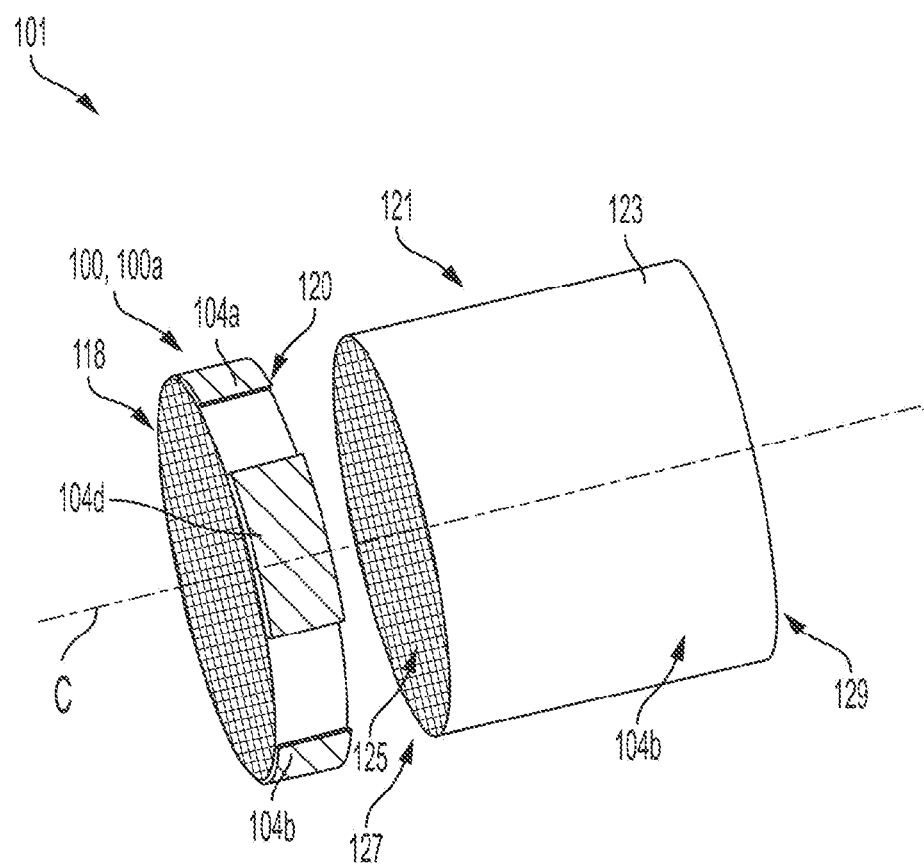
FIG. 3 depicts a perspective view of an exhaust treatment system comprising a heater for heating a catalyst and an exhaust treatment device according to an example.

FIG. 3 shows a perspective view of heater 100a. The structure, features, function, and other description of the heater 100a pertains to the other examples of heaters sharing the same reference numeral 100 but appended by different alphabetic suffixes (e.g., the heaters 100a-100j). At least a subset of the cells 113 extends axially between opposing end faces 118, 120 of the honeycomb body 102 to define a set of channels through which a gas can flow, e.g., the exhaust from the engine of a vehicle. The inlet face 118, can thus be in fluid communication with the outlet face 120 via the channels, so that a gas, incident upon inlet end face 118 can flow through the channels formed by the cells 113 and exhaust from outlet face 120. Outer electrodes 104 can extend the full axial length of the heater 100a (as shown in FIG. 3), or can extend along a portion of the axial length of the heater.

As shown in FIG. 3, an exhaust treatment system 101 comprises heater 100 disposed upstream of an exhaust treatment device 121, e.g., a substrate for a catalytic material, particulate filter, or partial filter. Like heater 100, exhaust treatment device 121 can comprise a honeycomb body comprising an outer skin 123 and a honeycomb structure 125. The honeycomb structure 125 can be impregnated or coated with a catalyst, that, when heated by the heater 100 and/or by the exhaust (which, in turn is heated by heater 100), activates to react with components of the exhaust. The honeycomb structure 125 of the exhaust treatment device 121 can comprise a matrix of intersecting walls, forming a plurality of contiguous cells. The cells of the exhaust treatment device 121, in cross-section can be formed of any suitable shape, including, for example, square, rectangular, triangular, or hexagonal. The cells of the exhaust treatment device 121 need not be the same shape or dimension as the cells 113 of the heater 100. Indeed, the cells of the exhaust treatment device 121 may be larger or smaller than the cells 113 of the heater 100, and/or may be a different shape in cross-section.

At least a subset of the cells of the exhaust treatment device 121 extend axially between opposing end faces 127, 129 of the exhaust treatment device 121 to define a set of channels through which a gas can flow. If the exhaust treatment device 121 is arranged as a filter, at least some of the channels can be plugged, e.g., alternatingly at opposite end faces 127, 129. The inlet face 127, can thus be in fluid communication with the outlet face 129 via the channels, so that a gas, incident upon inlet end face 127 can flow to the end face 129 directly through unplugged channels (e.g., in the case of an unplugged catalytic substrate), or be forced to flow through the porous walls separating adjacent channels of a plugged honeycomb body (e.g., in the case of a plugged particulate filter).

The exhaust treatment device 121 can be formed, for example, by extrusion of a ceramic forming material through an extrusion die as a green body, which is then cut, dried, and fired into a final ceramic honeycomb body (comprising outer skin 123 and honeycomb structure 125). The ceramic forming material can comprise inorganics (e.g., alumina, silica, etc.), binders (e.g., methylcellulose), pore formers (e.g., starch, graphite, resins), a liquid vehicle (e.g., water), sintering aids, or any other additives helpful in the manufacture of the final ceramic honeycomb body. The final ceramic honeycomb body of the exhaust treatment device 121 can comprise cordierite, aluminum titanate, alumina, mullite, silicon carbide, and/or other ceramic materials, or combinations thereof.

The current flowing through heater 100 serves to generate heat in the walls 112, thereby heating the exhaust or other gas flow that flows therethrough. The heater 100 can also be positioned adjacent to the exhaust treatment device 121 (e.g., closely coupled together) to provide radiant heating for the exhaust treatment device 121. Thus, the heater 100 heats the catalyst of the exhaust treatment device 121 by direct radiant heating and by heating the exhaust that flows through exhaust treatment device 121. In some embodiments, the heater 100 is axially shorter than exhaust treatment device 121, so that heater 100 will heat relatively quickly, e.g., due at least in part to the relatively smaller thermal mass of the heater 100. For example, the heater 100 may have an axial length of between about 0.25 inch to 0.5 inch when the exhaust treatment device 121 has an axial length of about 6 inches, although the length of the heater 100 can be set at other lengths suitable for providing sufficient heat to reach the desired temperatures in the heater 100 and/or in the exhaust treatment device 121. Furthermore, particularly when different material compositions, web thicknesses, channel sizes, and/or channel dimensions are utilized between the heater 100 and the exhaust treatment device 121, the heater 100 and the exhaust treatment device 121 can be extruded as separate bodies. In some embodiments, the heater 100 can be arranged as a catalytic substrate (i.e., having the walls of the heater 100 loaded with catalytic material) and/or particulate filter (i.e., having channels plugged alternatingly at opposite end faces) without the inclusion of exhaust treatment device 121 as a separate honeycomb body.

Returning to FIG. 1, the outer electrodes 104 of the heater 100 can be arranged into pairs groups of electrically-connected electrodes, for example pairs of electrodes as shown for heater 100a. Each electrode pair in heater 100a comprises two outer electrodes 104 that are peripherally-spaced about the honeycomb body 102, such that current flows in one or more current paths defined over portions of the walls 112 extending between the peripherally-spaced electrodes. For example, FIG. 1 shows outer electrodes 104 arranged into two pairs of oppositely-disposed electrodes: a first pair comprising electrodes 104a and 104b, and a second pair comprising electrodes 104c and 104d. Each of the electrodes 104a-104d comprise a length L engaged against the honeycomb body 102, which length L is arcuate due to the circular shape of the honeycomb body 102 in the embodiment of FIG. 1. The outer electrodes 104 of each pair are separated at center points 108 of their lengths L by a distance D, which in this embodiment is equal to the diameter of the honeycomb body 102. In other words, the center point 108 of outer electrode 104a is separated from the center point 108 of outer electrode 104b by distance D (the diameter of the honeycomb body 102) and the center point 108 of outer electrode 104c is also separated from the center point 108 of outer electrode 104d by distance D (the diameter of the honeycomb body 102).

Figure 4A:
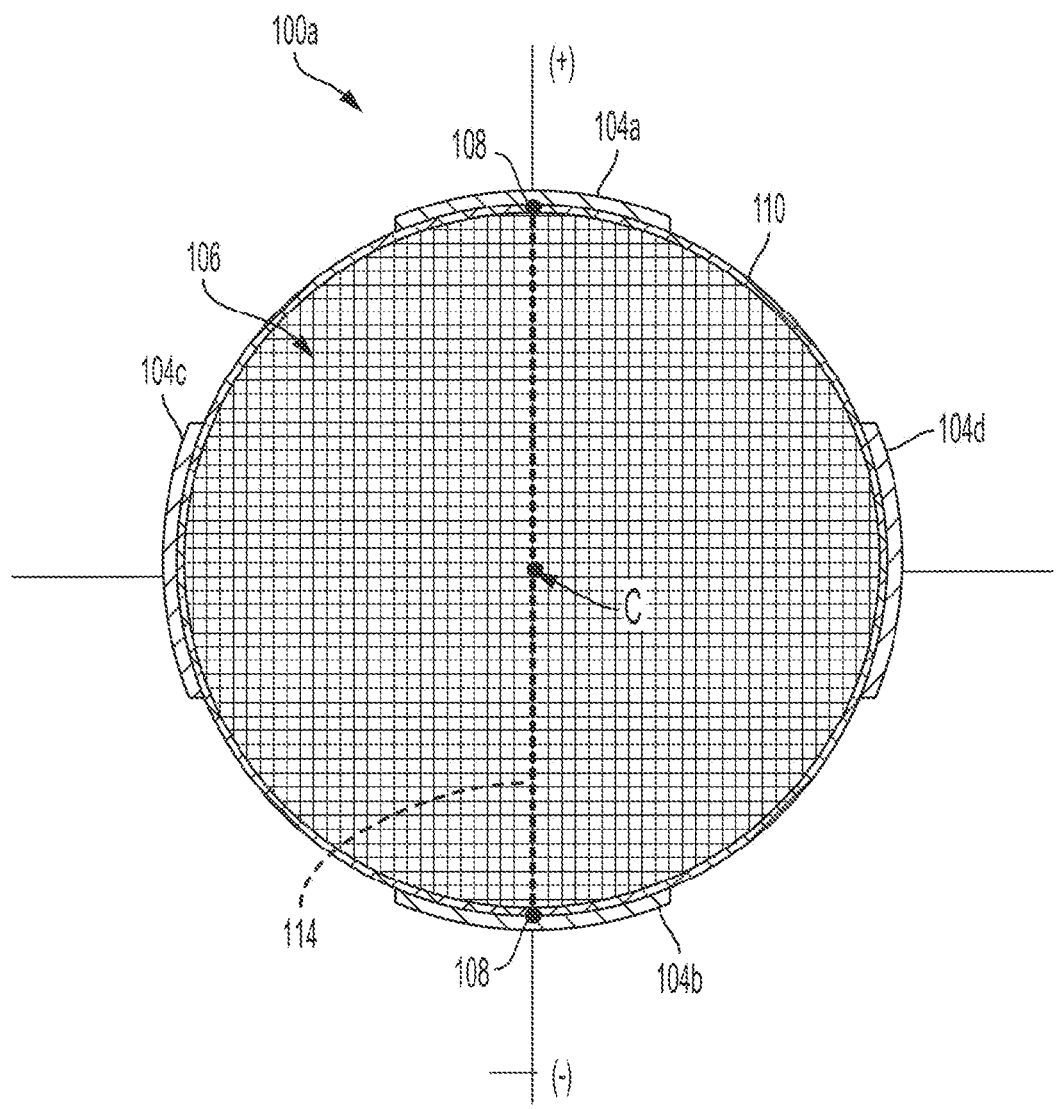
FIG. 4A depicts a cross-section of a heater for heating a catalyst, featuring multiple oppositely-disposed outer electrodes, according to an example.
Figure 4B:
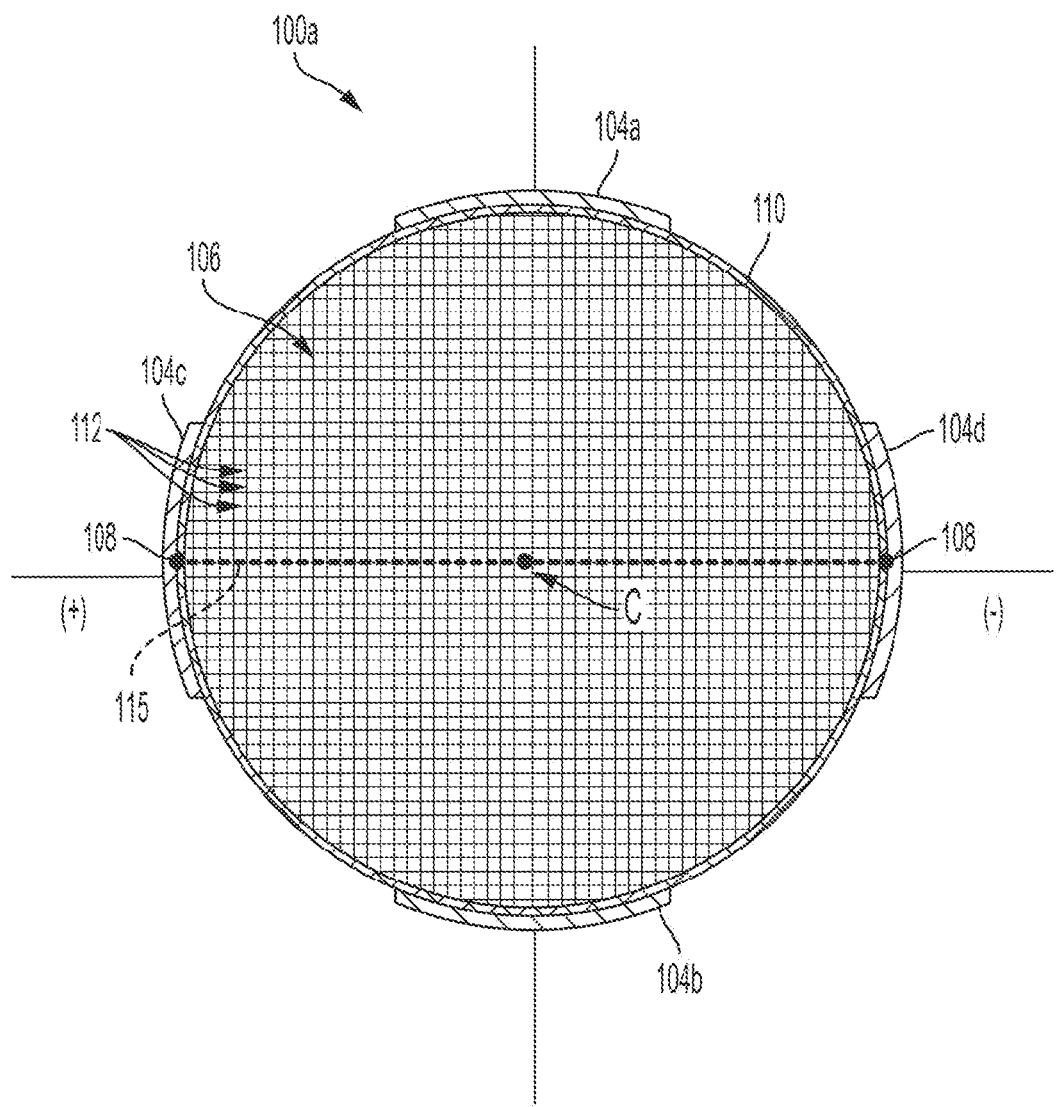
FIG. 4B depicts a cross-section of a heater for heating a catalyst, featuring multiple oppositely-disposed outer electrodes, according to an example.

Due to the arrangement of the walls 112 as an intersecting matrix of electrically-conductive elements and due to the lengths L of the electrodes spanning a distance over the periphery of the honeycomb body 102, multiple current paths may be formed through the walls 112 between any given pair of electrodes (that is, over multiple different combinations of the walls 112 and/or portions of the walls 112). In general, the current through each possible current-carrying path will be proportional to the resistance of the paths, and the sum of the resistances of all possible paths between each pair of electrodes can be represented by an equivalent resistance. For ease of discussion herein, since the length of each possible current path cannot always be feasibly determined, a central current path length for each pair of electrodes can be defined with respect to the shortest distance between the center points 108 over the walls 112 between the paired electrodes. For example, the electrodes 104a and 104b of FIG. 4A are aligned with respect to the walls 112 such that one of the walls 112 extends in a straight line between the center points 108 of the electrodes. That is, as shown in FIG. 4A, one of the walls 112 encounters the outer skin 110 at the center point 108 of the electrodes 104a and 104b perpendicularly (at an angle of 90°) with respect to the tangent of the honeycomb body 102 at the center point 108. In this way, a central current path 114 is formed through this one of the walls 112 that extends directly between the center points 108 of the electrodes 104a and 104b (and perpendicularly with respect to the tangent of the outer periphery of the honeycomb body 102 at the engagement of the honeycomb 102 with the electrodes 104a, 104b at the respective center points 108). In this embodiment, the central current path 114 has a length between the electrodes 104a and 104b that is equal to the diameter of the honeycomb body 102, as represented by the distance D in FIG. 1. Likewise, as shown in FIG. 4B, a central current path 115 is formed between the electrodes 104c and 104d when a voltage is applied thereto, with the central current path 115 formed through one of the walls 112 extending directly between the center points 108 of the electrodes 104c, 104d, thereby also having a length equal to the diameter of the honeycomb body 102.

Figure 4C:
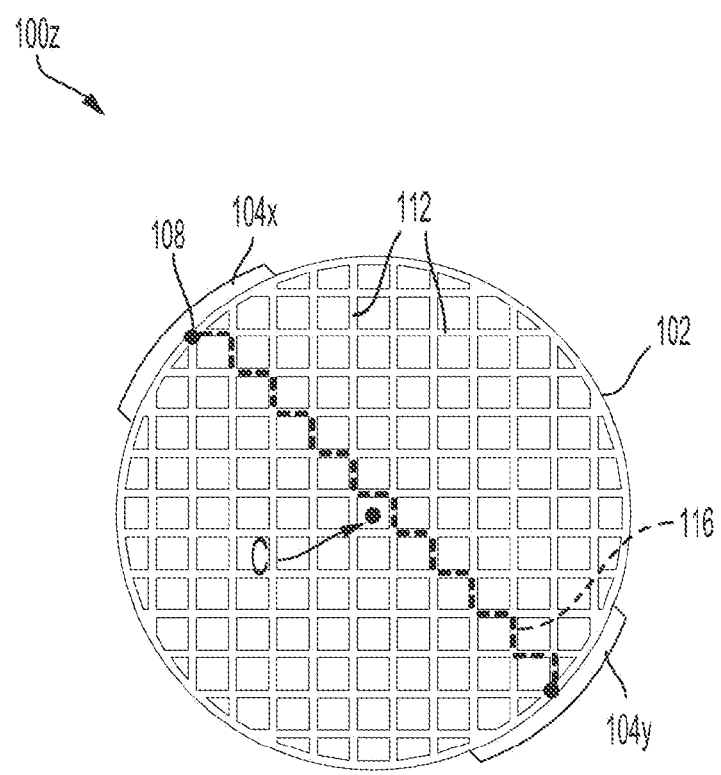
FIG. 4C depicts a cross-section of a heater for heating a catalyst, featuring multiple oppositely-disposed outer electrodes, according to an example.

The current path length can be longer than the diameter of the honeycomb body (longer than the distance D between the center points of oppositely-disposed electrodes) if the electrodes are aligned with respect to the orientation of the walls 112 such that none of the walls 112 extends in a single straight line between the center points 108. For example, in the case of the electrodes 104x, 104y in a heater 100z of in FIG. 4C, a central current path 116 is formed following a generally zig-zag path over portions of the walls 112 that connect between the electrodes 104x and 104y. That is, as shown in FIG. 4C, the walls 112 encounter the outer skin 110 at the center point 108 of the electrodes 104x and 104y at an angle of about 45° with respect to the tangent of the honeycomb body 102 at the center point 108. The current path length of the central current path 116 can thus be defined as a sum of the lengths of the portions of the walls 112 through which current travels along the central current path 116. Due to its zig-zag nature, the length of the central current path 116 in FIG. 4C will be significantly longer than the diameter of the honeycomb body 102 (in contrast to the length of the central current paths 114 and 115 in FIGS. 4A and 4B, which are equal to the diameter of the honeycomb body 102, as described above). For example, in FIG. 4C, the diameter of the honeycomb body is equal to approximately the width of about twelve to thirteen of the cells 113 (eleven full cells 113, and two partial cells 113 at each end), while the length of the central current path 116 is equal to approximately the width of about eighteen of the cells 113.

Although four outer electrodes 104 forming two pairs of electrodes are shown in FIG. 1, any suitable number of outer electrodes 104 can be disposed about outer periphery of honeycomb body 102, Furthermore, each electrode can be paired to more than one other peripherally-spaced electrode. For example, a single positive electrode can be electrically paired with two or more respective negative electrodes to produce a flow of current with respect to each of the paired negative electrodes.

Referring back to FIG. 4A, applying the voltage between outer electrodes 104a and 104b will generate current through the walls 112 centered approximately along the central current path 114 (shown in dotted lines) through one of the walls 112 that extends between the center points 108 of the electrodes 104a and 104b. As described above with respect to FIGS. 1 and 4A, the path length of the central current path 114 is equal to approximately the distance D between the electrodes 104a and 104b, which is also approximately equal to the diameter of the honeycomb body 102. The heat generated by heater 100a, in accordance with FIG. 4A, will be concentrated along and symmetrically centered about, the central current path 114. Likewise, applying the voltage between electrodes 104c and 104d, shown in FIG. 4B, will produce current, and, consequently, generate heat, in an area concentrated along and/or symmetrically centered about a central current path 115. Similarly, applying the voltage between electrodes 104x and 104y of FIG. 5 will result in the central current path 116, with respect to which heat will also be concentrated.

Figure 4D:
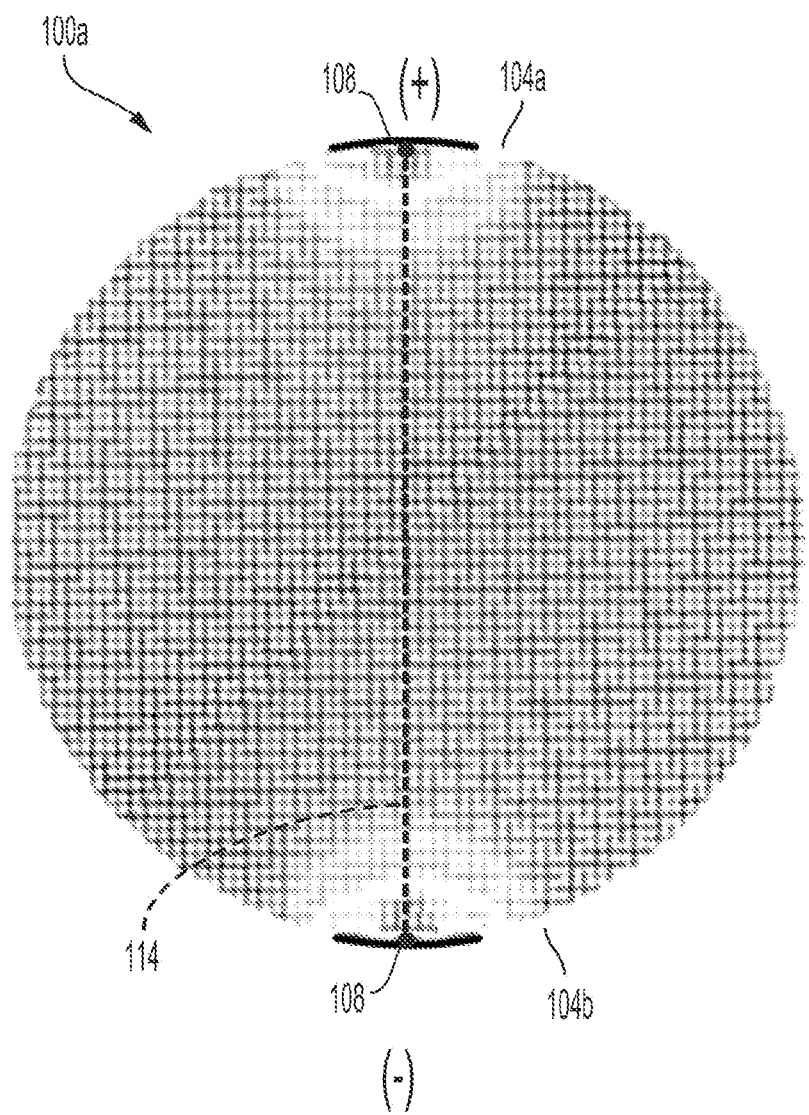
FIG. 4D depicts an example heat map showing a temperature of a heater, according to an example.
Figure 4E:
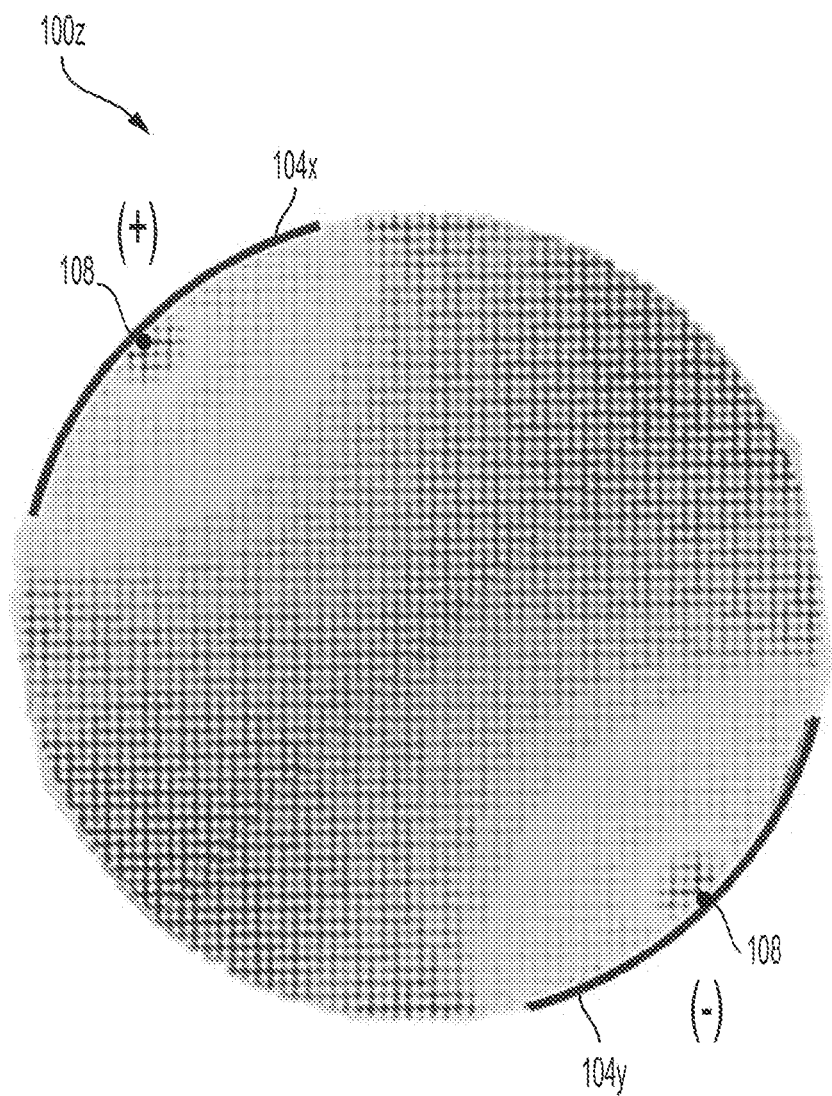
FIG. 4E depicts an example heat map showing a temperature of a heater, according to an example.

However, the central current paths 114, 115, 116 depicted in FIGS. 4A, 4B and 4C represent only one possible current-carrying path that exists between the center points 108 of a given pair of outer electrodes 104. That is, some of the current between each pair of electrodes will be carried over portions of the walls 112 not defined by the central current paths 114, 115, 116, and the total number of current paths formed between a particular pair of electrodes will be comprised of a larger number of the intersecting walls 112 that connect between each particular pair of electrodes. For example, FIG. 4D illustrates an example heat map of the temperature of the walls 112 of the heater 100a that can result from applying a voltage between the electrodes 104a and 104b. In FIGS. 4D and 4E, walls 112 that are illustrated in black or darker coloring are relatively cooler, while walls 112 illustrated in white or lighter/brighter coloring are relatively hotter. As shown in the example of FIG. 4D, the temperature is highest adjacent to and along the length L of the electrodes 104a and 104b, where the current density is highest. The relatively hotter temperature area extends from each electrode 104a, 104b in a generally wedge-shape fanning out from the electrodes 104 along their respective lengths, and extending partially along the central current path 114. The temperature profiles corresponding to the electrodes 104c and 104d of FIG. 4B will similarly resemble that depicted in FIG. 4D, but rotated appropriately in accordance with the position of these electrodes on their respective heaters and centered along their corresponding central current paths 115. Similarly, FIG. 4E shows an example temperature map for that can result from applying a voltage between the electrodes 104x and 104y of the heater 100z of FIG. 4C. Due to the small size of the cells 113 in FIG. 4E, the central current path 116 for the heater 100z is not illustrated in FIG. 4E, but can be understood from FIG. 4C as extending in a zig-zag pattern over the walls 112 between the center points 108 of the electrodes 104x and 104y.

To generate current, and therefore more uniformly generate heat, across the entire cross-section of honeycomb body 102, a voltage is applied to the pairs of the electrodes 104 in some embodiments according to a predetermined heating sequence. For example, in the example of FIGS. 4A and 4B, a voltage can first be applied between electrodes 104a and 104b (as shown in FIGS. 4A and 4D) for a first time period and then between electrodes 104c and 104d (as shown in FIG. 4B) for a second time period. The first and second time periods can be any length of time suitable for generating a desired amount of heat in the walls 112 of the heater. For example, the first and second time frames can each last one or more seconds, or fractions of a second, during which time frames the corresponding electrodes are cycled on and off.

Applying the voltage to pairs of outer electrodes 104 sequentially, rather than concurrently, can be useful to prevent current flowing between outer electrodes 104 that are not oppositely-disposed. In other words, applying the voltage sequentially between oppositely-disposed pairs of electrodes 104 will create current paths that run across the diameter of honeycomb body, e.g., through or adjacent to the central axis C, rather than through the skin 110 or otherwise along shorter paths between adjacent electrodes.

In some embodiments all electrodes are simultaneously powered. For example, in contrast to sequential heating, if a positive voltage were simultaneously applied to electrodes 104a and 104c, and electrodes 104b and 104d were grounded, current may flow between electrode 104a and electrode 104d and between electrode 104b and electrode 104c, rather than between oppositely-disposed electrodes 104a and 104b and oppositely-disposed electrodes 104c and 104d. If the majority of current is carried between adjacent electrodes (e.g., between electrodes 104a and 104d, between electrodes 104a and 104c, between electrodes 104b and 104c, and/or between electrodes 104b and 104d) instead of oppositely-disposed electrodes (e.g., electrodes 104a and 104b or electrodes 104c and 104d), this may create hot spots in the walls between the adjacent electrodes, and thereby fail to heat other portions, such as near the center of the honeycomb body 102. In this way, the sequential application of a voltage between designated pairs of electrodes, such as oppositely-disposed pairs of electrodes, promotes current flow across the entire cross-section of the honeycomb body, and, thus, the more uniform heating of heater 100.

Figure 5:
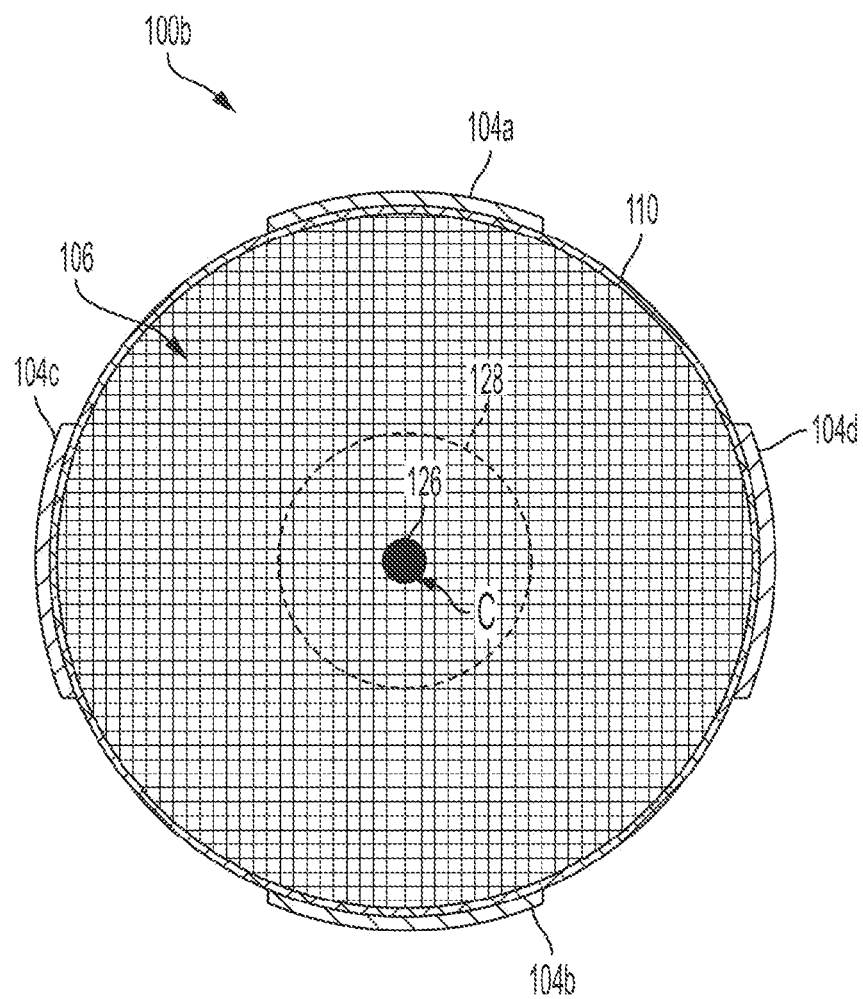
FIG. 5 depicts a cross-section of a heater for heating a catalyst, featuring multiple oppositely-disposed outer electrodes and an interior electrode, according to an example.

In addition to outer electrodes 104, heater 100 can include electrodes disposed within the interior of honeycomb body 102. Such interior electrodes can, for example, be positioned to introduce additional current flow in areas in which additional heat is desired, e.g., areas expected to receive a greater amount of exhaust flow in comparison to other areas of the heater 100. For example, as shown in FIG. 5, an interior electrode 126 is disposed at central axis C of heater 100b to promote the flow of current, and, as a result, generation of heat, in a zone 128 disposed locally about and encompassing central axis C. Interior electrode 126, disposed at the central axis C in this way, can receive a voltage between it and any or all other outer electrodes 104. However, the interior electrode 126 need not be placed at central axis C, and, instead, can be placed at any location in honeycomb structure 106 for which a greater amount of current is desired. Furthermore, multiple interior electrodes 126 can be placed in the interior of honeycomb body 102. A voltage can be applied between any or all of interior electrodes 126 and any or all of outer electrodes 104, or between interior electrodes 126 themselves, either simultaneously or as part of a heating sequence.

Figure 6A:
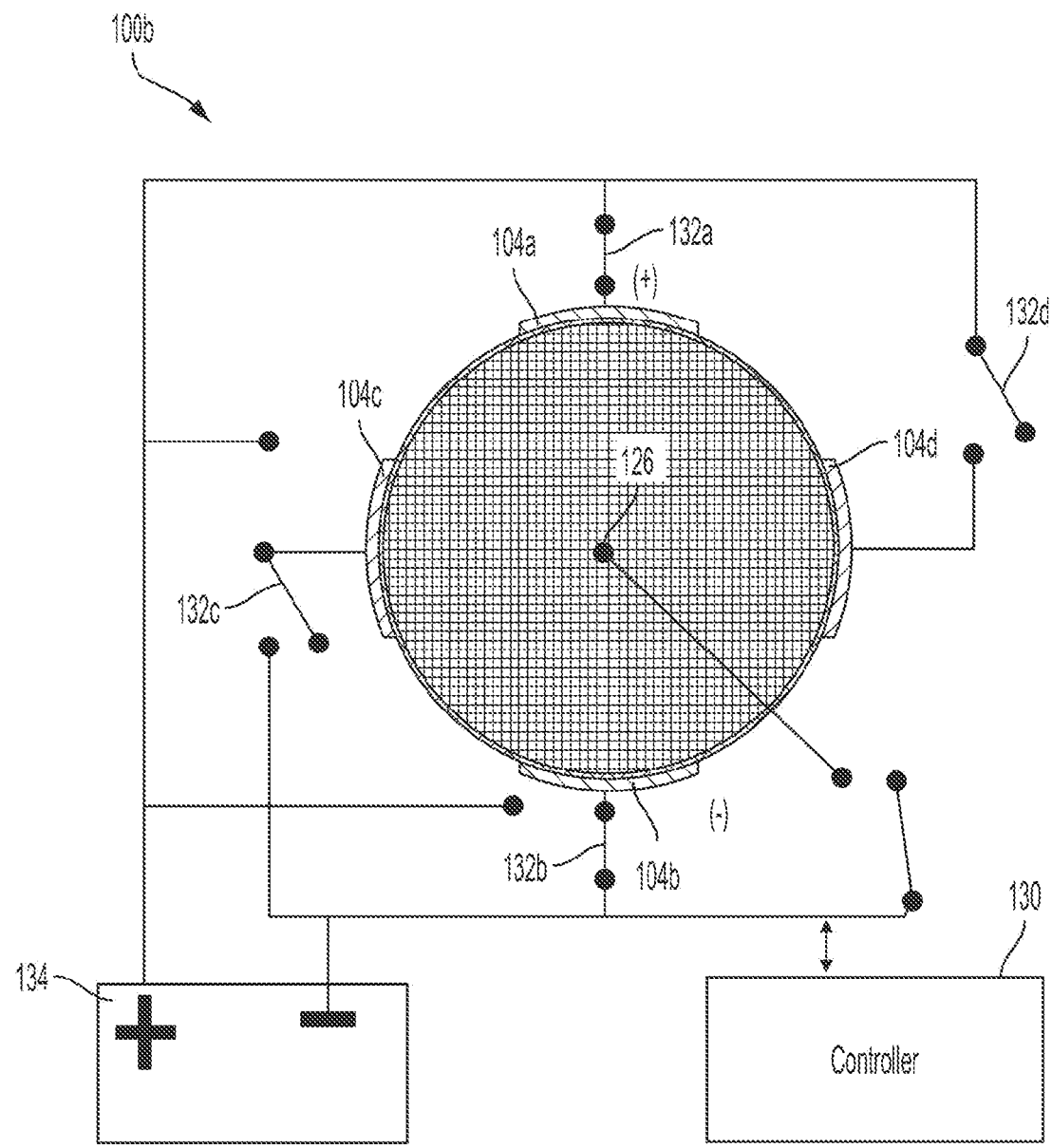
FIG. 6A depicts a cross-section of a heater for heating a catalyst, a voltage source, and a controller, according to an example.
Figure 6B:
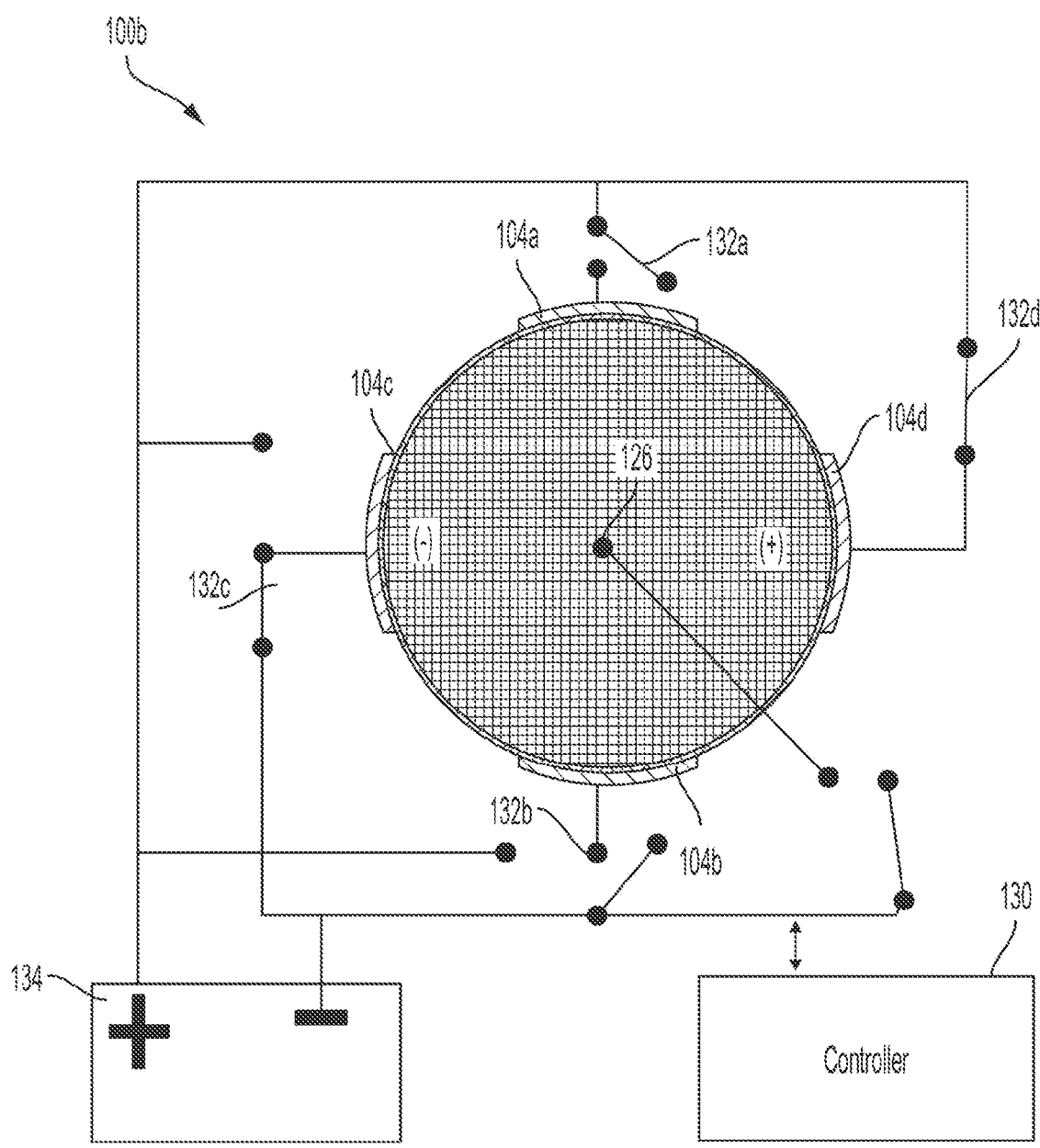
FIG. 6B depicts a cross-section of a heater for heating a catalyst, a voltage source, and a controller, according to an example.
Figure 6C:
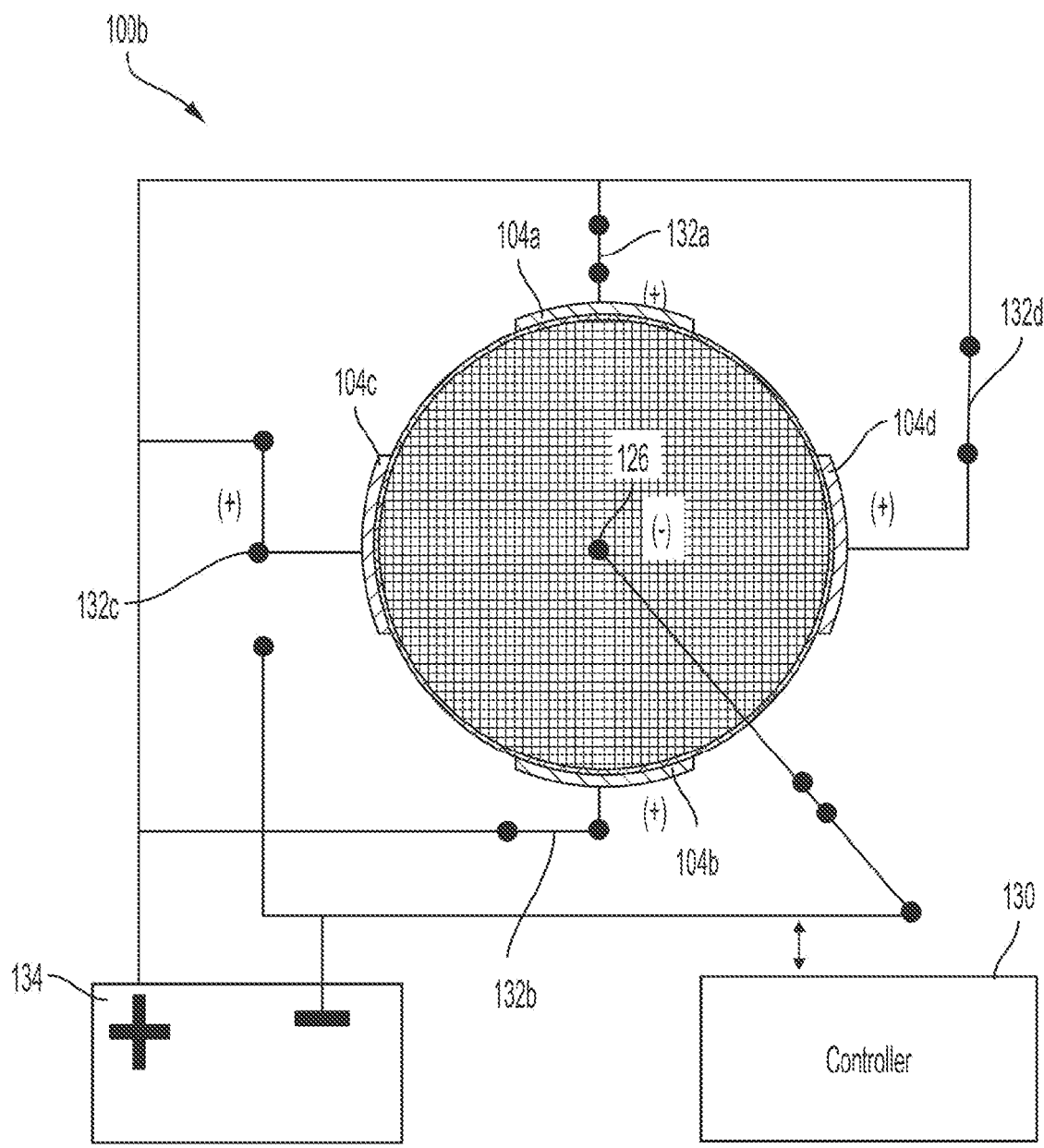
FIG. 6C depicts a cross-section of a heater for heating a catalyst, a voltage source, and a controller, according to an example.

FIGS. 6A-6C show an example of a heating sequence of heater 100b, which features four outer electrodes 104 (two oppositely-disposed electrode pairs) and the interior electrode 126 disposed at the central axis C. In the sequence shown, a voltage is first applied across outer electrodes 104a and 104b as depicted in FIG. 6A. Next in the sequence, as shown in FIG. 6B, a voltage is applied across outer electrodes 104c and 104d. And finally, as shown in FIG. 6C, a voltage is applied between the interior electrode 126 and outer electrodes 104. The heating sequence depicted in FIGS. 6A-6C is merely shown as an example, and any sequence suitable for heating the honeycomb body 102 can be implemented.

As shown in FIGS. 6A-6C, a controller 130 is in communication with the electrodes 104, 126 in order to control application of the voltage between various configurations of outer electrodes 104 and/or interior electrodes 126. In the example of FIGS. 6A-6C, controller 130 can apply a voltage across different electrodes 104 by setting a series of switches 132 disposed to interrupt or institute an electrical connection between one or more electrodes 104 and a terminal of a power source, shown as an automotive battery 134. For example, as shown in FIG. 6A, switch 132a is disposed to interrupt or establish an electrical connection between electrode 104a and the positive terminal of automotive battery 134, depending on the position (open or closed) of switch 132. Controller 130 thus determines whether electrode 104 is in electrical communication with the positive terminal of automotive battery 134 by setting the position of switch 132. Extending this out to the remaining electrodes 104, controller 130 can configure the voltage to be applied across honeycomb body during at any given point of the sequence by setting the position of switches 132.

Although each electrode is shown with a switch 132 disposed to interrupt or establish an electrical connection with one terminal of automotive battery 134, in alternate examples, each electrode can be configured to be connectable (e.g., by more than one switch) between either terminal. Furthermore, each switch 132 can interrupt or institute an electrical connection between a terminal and more than one electrode 104. For example, a switch 132 can be connected at one side to a terminal and at the other side to several of electrodes 104, 126. This, however, would prevent the electrodes 104, 126 to which the switch 132 is connected, from being sequentially activated with respect to each other.

The heaters 100 disclosed herein can comprise any additional intervening circuitry such that each electrode 104, 126 is not directly connected to the terminal of a battery, but rather has some intervening circuitry that conditions the voltage of the battery for application to the electrode(s). Such circuitry is generally known in the art and thus does not merit additional discussion herein. Furthermore, voltage sources other than an automotive battery can be utilized.

Controller 130 can comprise a processor and a data storage medium, e.g., a non-transitory storage medium, such as a hard drive or solid state drive, storing program code that, when executed by the processor, carries out instructions for instituting a heating sequence (e.g., such as the sequence described in connection with FIGS. 6A-6C). Controller 130 can, alternatively or additionally, comprise hardware, firmware, or software components configured for instituting such a heating sequence.

Switches 132 can each comprise any solid-state switch (e.g., MOSFET or BJT) or mechanical switch suitable for being controlled by controller 130 and for interrupting and instituting an electrical connection between one or more electrodes 104, 126 and one or more voltage sources.

In any given heating sequence, a cooling interval (i.e., a period of time in which no voltage is applied to selected ones of electrodes 104 or 126) can be interposed between heating intervals (a heating interval being a period of time in which a voltage is applied across at least two electrodes of electrodes 104, 126), in order to allow local hot spots to dissipate via conduction to nearby walls. For example, in the example of FIGS. 6A-6C a cooling interval can be applied between the heating interval of FIG. 6A and the heating interval of FIG. 6B, to allow any hotspots that formed (e.g., near electrodes) to dissipate to the nearby walls. The length of the cooling interval can be predetermined to create a desired temperature uniformity (e.g., all temperatures across the face of the heater 100 being within a preset maximum and minimum temperature threshold). In some embodiments, the heating interval is a fraction of a second, such as between about 10 ms and 500 ms, less than 500 ms, or less than 250 ms, less than 150 ms, less than 100 ms, or less than 50 ms, while the cooling interval is shorter than the heating interval, for example, one-half or one-third the length of the heating interval. For example, a cooling interval of approximately 50 ms can be implemented between heating intervals of 100 ms. Although the controller 130, automotive battery 134, and switches 132 are shown in connection with heater 100b, such a configuration can be adapted for any example of heater 100, including heaters 100a-j.

Current paths through the walls 112 of different resistances between pairs of the electrodes 104 can depend on the shape of the cells 113 and the orientation of the cells 113 with respect to the electrodes 104. For example, such disparate resistances may arise due to the varying lengths of current path between the electrodes 104 that arise from the shapes of cells 113 and the orientation of the walls 112 with respect to the electrodes 104. For example, taking the square cross-section of cells 113 of heater 100d shown in FIG. 7A, the current paths between outer electrodes 104e and 104f will be direct, as the intersecting walls 112 form straight lines between outer electrodes 104e and 104f. That is, similar to heater 100a discussed above, one of the walls 112 intersects the center points 108 of the electrodes 104e and 104f at an angle that is perpendicular to the tangent of the honeycomb body 102 at the center points 108. In this way, the central current path between the electrodes 104e and 104f will resemble the current paths 114 and 115, discussed above, extending in a straight line across the honeycomb body 102 and having a length equal to the diameter of the honeycomb body.

By contrast, the current paths between outer electrodes 104i and 104j are not directly formed in a straight line, as the current is forced to flow along a staggered or zig-zag path of portions of intersecting walls 112. As a result, the central current path between the center points of electrode 104*i* and electrode 104*j* will be longer, and thus more resistive, than the current path between centers of electrode 104*e* and electrode 104*f* (similar to the length of central current path 116 being longer than the diameter of the heater 100*z* as discussed with respect to FIG. 4C). This difference in the lengths of the different current paths results regardless of the fact that electrodes 104*e* and 104*f* and electrodes 104*i* and 104*j* are both separated by the diameter of the honeycomb body 102 (i.e., the distance D), since the current between each pair of electrodes must travel through the walls 112.

Figure 7A:
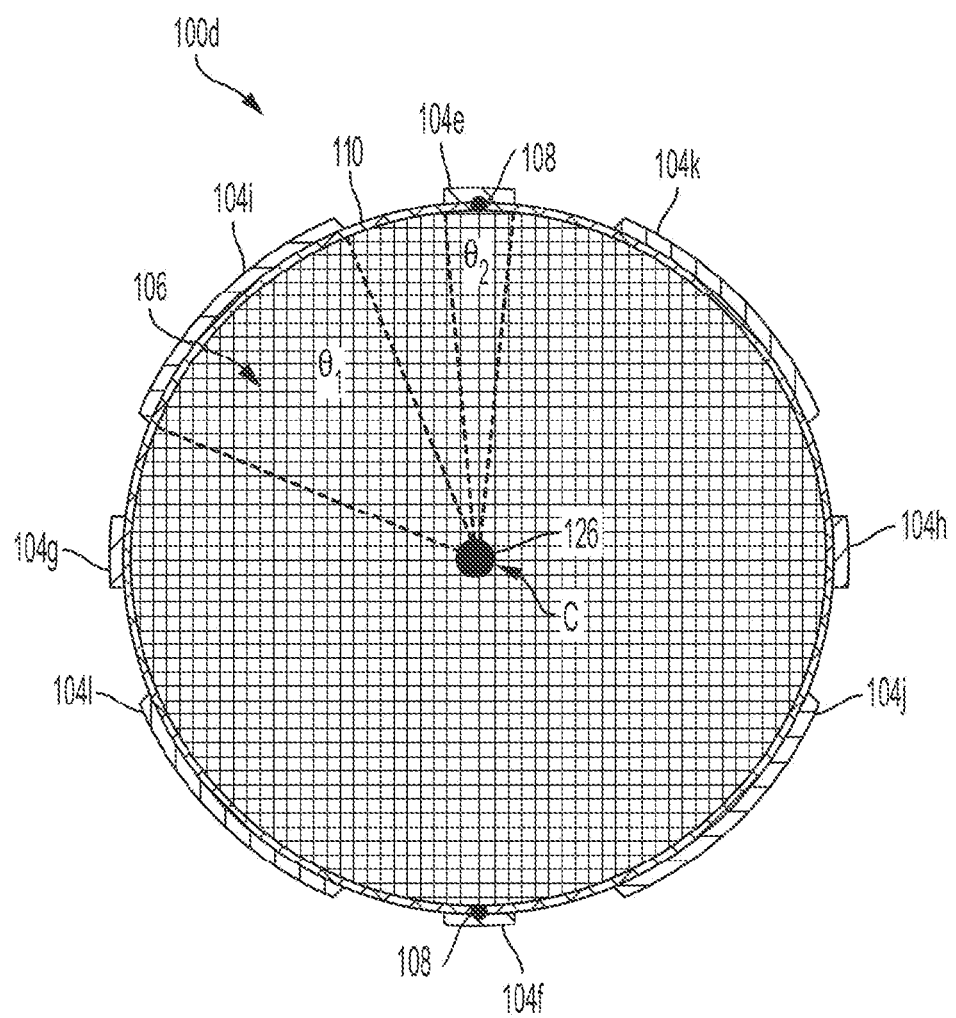
FIG. 7A depicts a cross-section view of a heater for heating a catalyst, featuring multiple outer electrodes of varying arc length, according to an example.
Figure 7B:
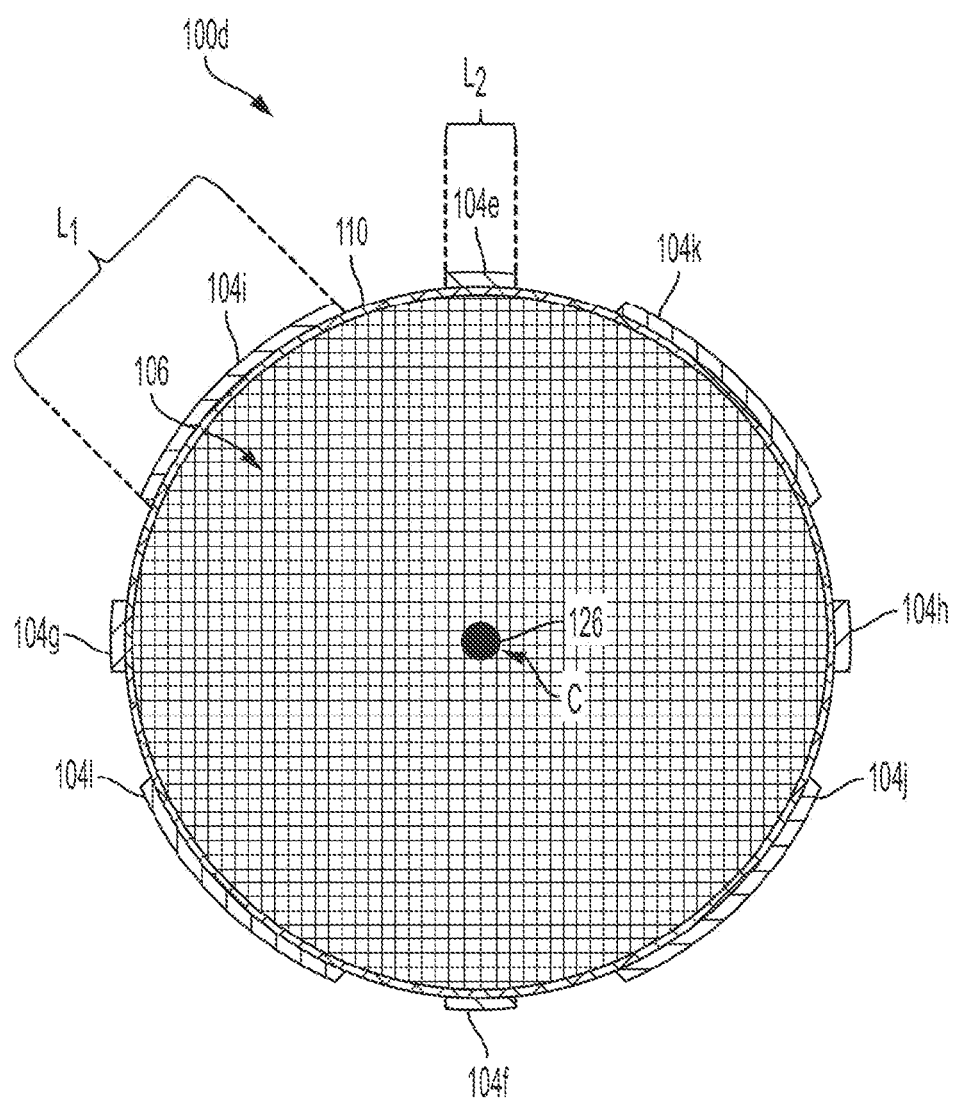
FIG. 7B depicts a cross-section view of a heater for heating a catalyst, featuring multiple outer electrodes of varying arc length, according to an example.

In some embodiments, such as shown in FIGS. 7A-7B, the length of each outer electrode 104 engaged against the honeycomb body 102 (e.g., arc length of the electrodes) of each electrode pair is proportional to the length of the central current path between the respective center points of the electrodes 104 forming that electrode pair. That is, longer current paths will have a higher resistance than shorter current paths, all other variables remaining equal. In this way, a more uniform heating profile can be accomplished by varying the length of the electrodes 104 in each pair in proportion to the length of the current paths between each pair. It would not be feasible to find the length of every possible current path between each pair of electrodes, so the central current paths as described herein can be representatively useful for this purpose.

For example, as shown in FIGS. 7A-7B, the arc lengths of outer electrodes 104*e* and 104*f* (as well as 104*g* and 104*h*) are shorter than the arc lengths of outer electrodes 104*i* and 104*j* (as well as 104*k* and 104*l*), to account for the longer current path between electrodes 104*i* and 104*j*. This is depicted in FIG. 7A by showing the difference in a first angle $\theta_1$, having as vertices the ends of electrode 104*i* and central axis C, and a second central angle $\theta_2$, having as vertices the ends of electrode 104*e* and central axis C. In other words, the angles $\theta_1$ and $\theta_2$ corresponds to the length over which the corresponding electrodes are engaged with the honeycomb body 102. Because, the honeycomb body of FIG. 7A has a circular cross-section, the difference in central angles $\theta_1$ and $\theta_2$ will be proportional to the differences in arc lengths between electrode 104*i* and electrode 104*e*. Thus, as shown, central angle $\theta_1$ is greater than central angle $\theta_2$ because electrode 104 has a greater length than electrode 104. For example, as shown in FIG. 7B, a first length L1 of the electrode 104*i* (and of electrodes 104*j*, 104*k*, and 104*l*) is longer than a second length L2 of the electrode 104*e* (and of electrodes 104*f*, 104*g*, and 104*h*).

By increasing the arc length of a given pair of outer electrodes 104, current will be directly provided by the electrode to a larger number of intersecting walls 112 as a result of the applied voltage. Stated differently, if electrodes 104 of a given pair of outer electrodes 104 having a relatively longer length (arc angle), the total number of current paths between those electrodes should be larger than the total number of current paths between pair of outer electrodes 104 with a relatively shorter length (arc angle). An example of this can be seen in FIGS. 7A-7B. Paired electrodes 104*i* and 104*j* have a longer length (L1) than the length (L2) of paired electrodes 104*e* and 104*f*. As a result, the number of walls 112 that terminate at the electrode 104*i* and/or intersect with a portion of the skin 110 engaged against the electrode 104*i* is greater than the number of walls 112 that terminate at the electrode 104*e* and/or intersect with a portion of the skin 110 engaged against the electrode 104*e*. In this way, despite the longer length of the current paths between the electrodes 104*i* and 104*j* (e.g., represented by the length of a central current path) in comparison to the length of the current paths between the electrodes 104*e* and 104*f*, the equivalent resistance of the current paths between electrodes 104*i* and 104*j* will thus be more uniform or even the same as the equivalent resistance of the current paths between electrodes 104*e*, 104*f*. Thus, by varying the length of electrodes in proportion to the length of the current paths, e.g., the central current path, the equivalent resistance between different pairs of oppositely-disposed electrodes can be made to be substantially similar. By creating more uniform equivalent resistance for each of the pairs of electrodes 104, a more uniform temperature, can be achieved across the face of the heater 100.

Rather than, or in addition to, varying the length of electrodes 104, the average voltage applied to a given pair of electrodes 104 can be varied, e.g., in proportion to the length of the current path running between the oppositely-disposed-electrode pairs. For example, the average voltage between different electrode pairs can be varied by: varying the magnitude of a voltage applied to each electrode pair; by varying the duty cycle of a pulse-width modulated voltage waveform applied to each electrode pair; by varying the duration of time for which the voltage is applied, or by some combination of these methods. For example, during a heating sequence a first voltage magnitude can be applied to one pair of outer electrodes 104 and a second voltage magnitude can be applied to another pair of outer electrodes 104, the first voltage magnitude being higher than the second voltage magnitude. This will result in an increased average voltage applied to the first pair of oppositely-disposed outer electrodes 104 (assuming that the voltages are applied for the same period of time).

Varying the magnitude of the voltage applied can be accomplished in a variety of ways. Generally speaking, however, the magnitude can be varied by applying a different voltage at the voltage source (e.g., at the circuit that conditions the voltage from the automotive battery 134) or by placing some resistance in series with a given pair of outer electrodes 104. For example, if a first resistance is placed in series with a first pair of outer electrodes 104, and a lower second resistance is placed in series with a second pair of outer electrodes 104, the magnitude of the voltage across the first pair of outer electrodes 104 will be less than the magnitude of the voltage across the second pair of electrodes 104. The resistances can implemented as discrete elements (i.e., resistors). Alternatively, instead of placing resistances in series with the outer electrodes 104, the composition or thickness of outer electrodes 104 can be varied in order to vary the intrinsic resistance of outer electrodes 104 themselves.

As mentioned above, the duty cycle of a pulse-width modulated waveform can be respectively adjusted for each pair of oppositely-disposed electrodes 104. A pulse-width modulated waveform can be implemented by rapidly switching the voltage applied to each electrode pair ON and OFF. By varying the duration of time that the switch is ON (i.e., the duty cycle), the average voltage applied to a given electrode pair can be varied. For example, a pulse-width modulated waveform having a duty cycle of 70% can be applied to one pair of outer electrodes 104; whereas, a pulse-width modulated waveform having a duty cycle of 30% can be applied to a different pair of oppositely-disposed outer electrodes 104. As a result, the average voltage applied to the first pair can be 40% than the second pair.

Similarly, the total time a voltage is applied to the pairs of outer electrodes 104 can be varied between outer electrode 104 pairs. For example, a voltage can be applied to a first pair of oppositely-disposed outer electrodes 104 for a first period of time (e.g., 12 ms) and to a second pair of oppositely-disposed outer electrodes 104 for a second period of time (e.g., 100 ms). All other things being equal, this, like varying the voltage magnitude and the duty cycle, will vary the average voltage applied between outer electrode 104 pairs.

Furthermore, some examples can use a combination of the above methods for varying the average voltage. For example, a heater can vary the magnitude of voltage applied and the time it is applied, between various electrode pairs.

In addition, although the above examples of varying the average voltage has been described in connection with outer electrodes 104, the same methods of varying the average voltage can be used can be used for a pair of electrodes that includes an interior electrode and an outer electrode.

Furthermore, the length of the electrodes 104, the average voltage applied between electrodes 104, and the electrodes 104 to which the voltage is applied, can be varied in order to compensate for additional exhaust flow received a given area. Also, the web thickness within a given area, e.g., within zone 128 shown in FIG. 4C, or the composition of the webs within a given area, can be varied (e.g., by selectively coating or impregnating the webs with a conductive material) to change the resistance of the area, in order to compensate for the additional exhaust flow.

As discussed above, a heating sequence can be employed to create a more uniform temperature across the face of the heater 100, e.g., to remove hot spots (e.g., temperatures over a maximum threshold) or cold spots (e.g., temperatures below a minimum threshold). An example heating sequence with respect heater 100*d* of FIGS. 7A-7B, is shown in FIGS. 8A-8H, as determined via modeling. At a first step of the heating sequence, shown in FIG. 8A, a voltage is applied between the interior electrode 126 and each outer electrode 104 for a first time period, e.g., 12 ms. At a second step, shown in FIG. 8B, a positive voltage is applied to outer electrode 104*a* and outer electrode 104*d*, and a negative voltage is applied to outer electrode 104*b* and outer electrode 104*c* for 16 ms. At a third step, shown in FIG. 8C a voltage is applied across electrode 104*a* and electrode 104*b* for 12 ms. At a fourth step, shown in FIG. 8D, a voltage is applied across electrode 104*e* and electrode 104*f* for 100 ms. At a fifth step of the heating sequence, shown in FIG. 8E, a voltage is again applied between the interior electrode 126 and each outer electrode 104 for a 12 ms. At a sixth step, shown in FIG. 8F, a positive voltage is again applied to outer electrode 104*a* and outer electrode 104*d*, and a negative voltage is applied to outer electrode 104*b* and outer electrode 104*c* for 16 ms. At a seventh step, shown in FIG. 8G a voltage is applied across electrode 104*c* and electrode 104*d* for 12 ms. At an eight step, shown in FIG. 8H, a voltage is applied across electrode 104*g* and electrode 104*h*. A cooling interval of 50 ms was implemented in between each of the above steps.

The above example heating sequence is merely provided to illustrate the type of heating sequence that can be used to heat honeycomb body 102. Other sequences for the heater 100, e.g., including a different order of electrode activation, longer or shorter activation and/or cooling time periods, different numbers of electrodes, or simultaneous activation of multiple electrode pairs suitable for heating honeycomb body 102 and consistent with the description in this disclosure can be implemented in other examples.

Figure 8A:
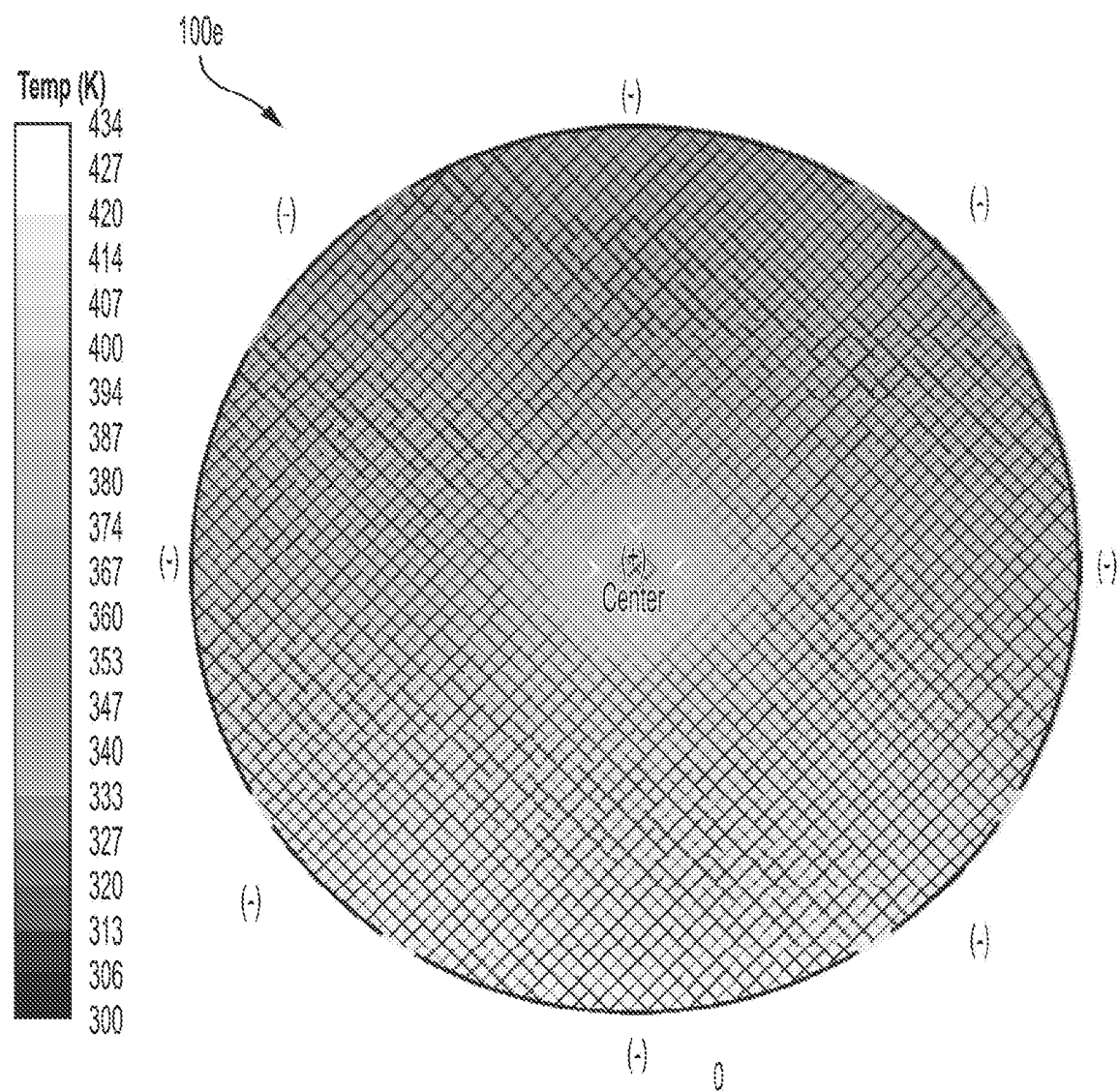
FIG. 8A depicts a heat profile of a heater for heating a catalyst, featuring multiple outer electrodes and an interior electrode, during a heating sequence, according to an example.
Figure 8B:
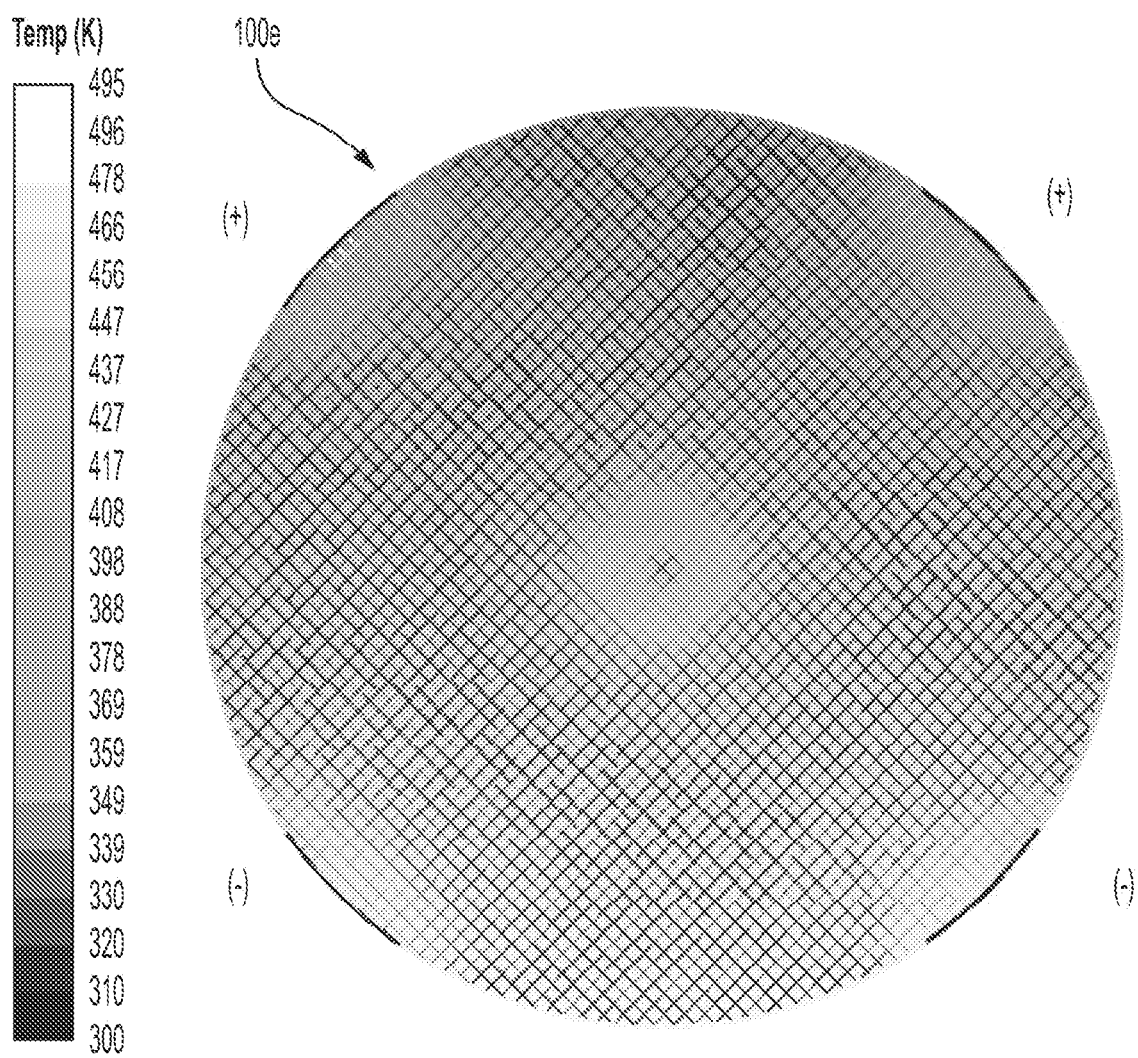
FIG. 8B depicts a heat profile of a heater for heating a catalyst, featuring multiple outer electrodes and an interior electrode, during a heating sequence, according to an example.
Figure 8C:
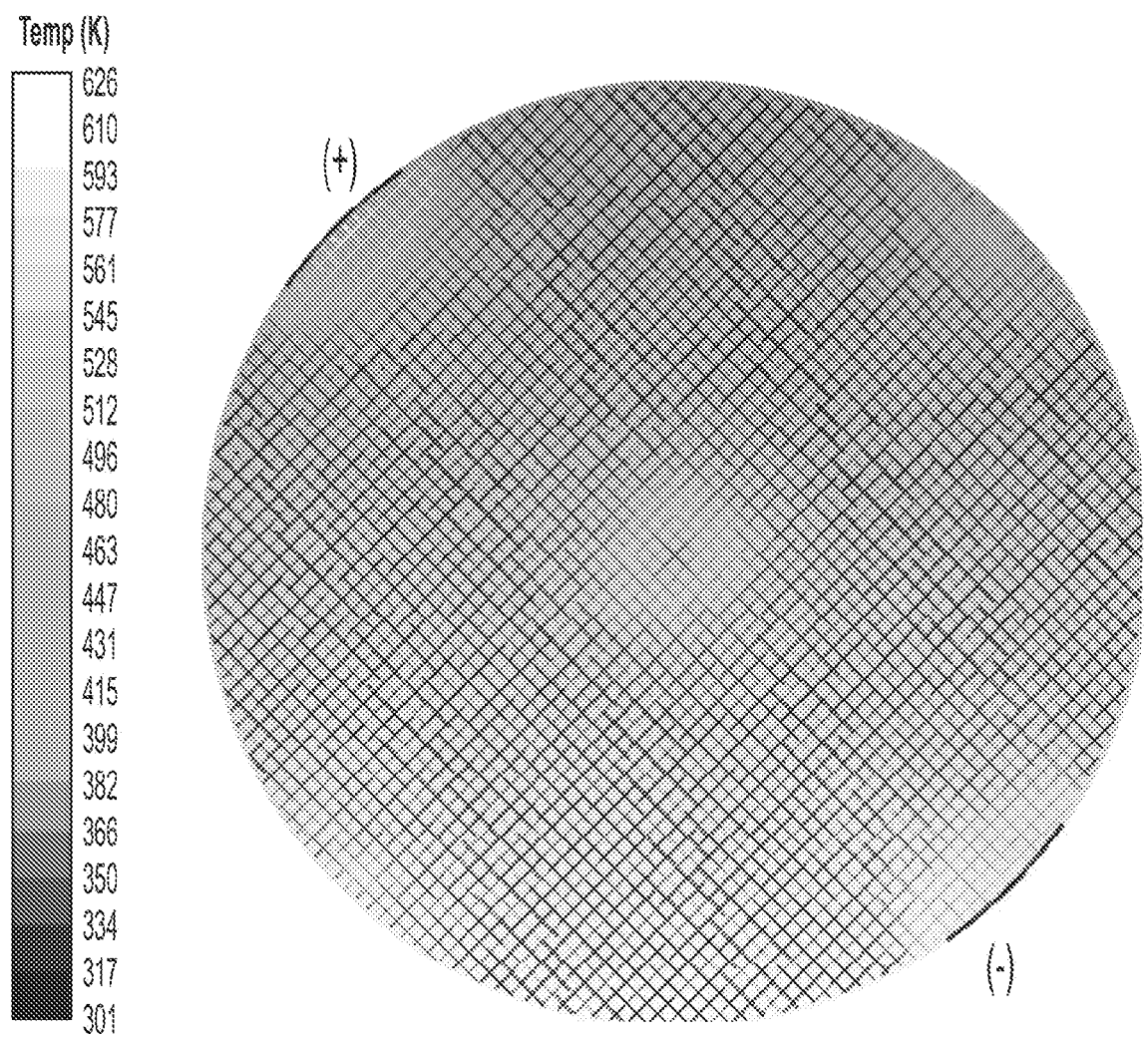
FIG. 8C depicts a heat profile of a heater for heating a catalyst, featuring multiple outer electrodes and an interior electrode, during a heating sequence, according to an example.
Figure 8D:
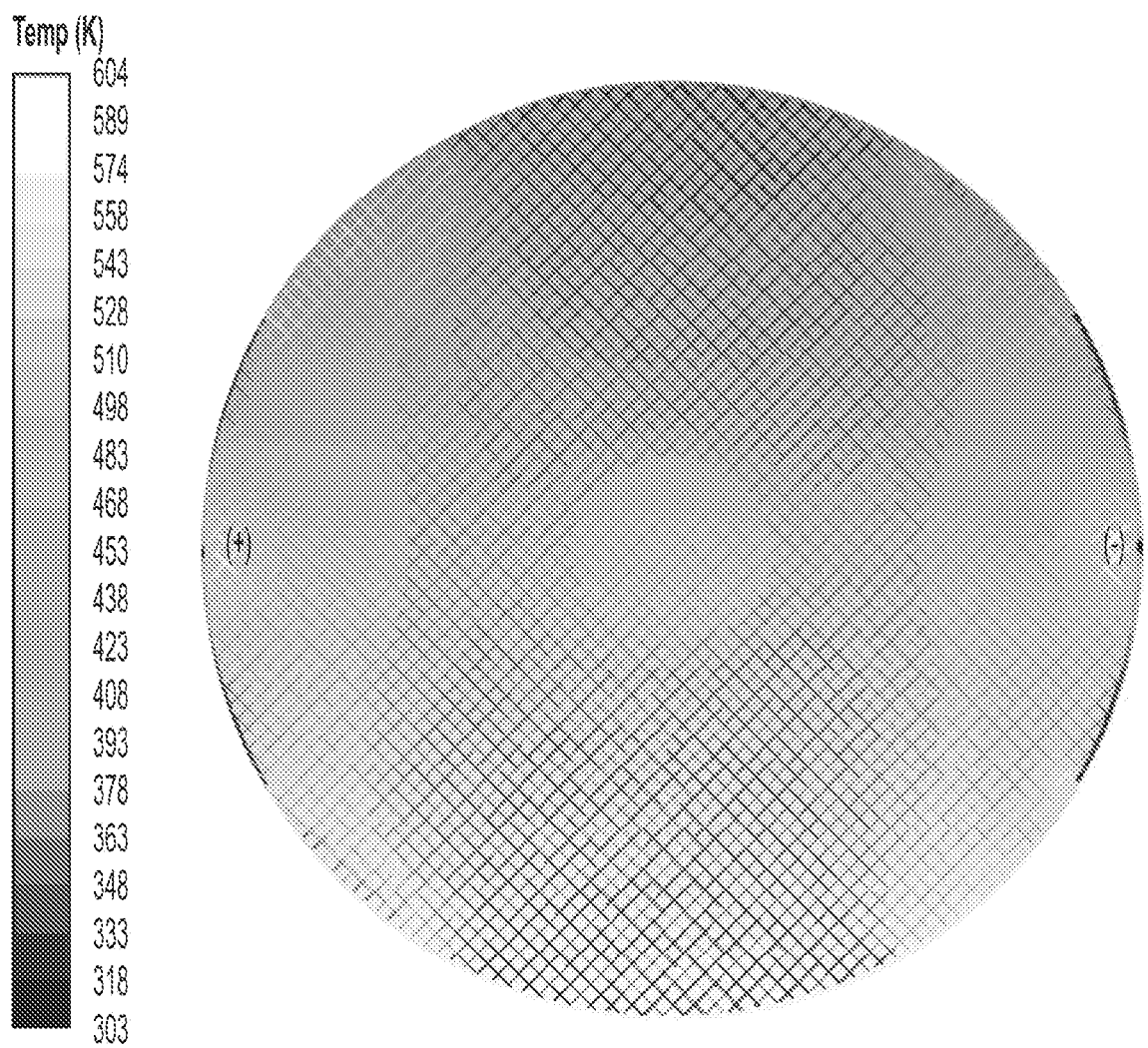
FIG. 8D depicts a heat profile of a heater for heating a catalyst, featuring multiple outer electrodes and an interior electrode, during a heating sequence, according to an example.
Figure 8E:
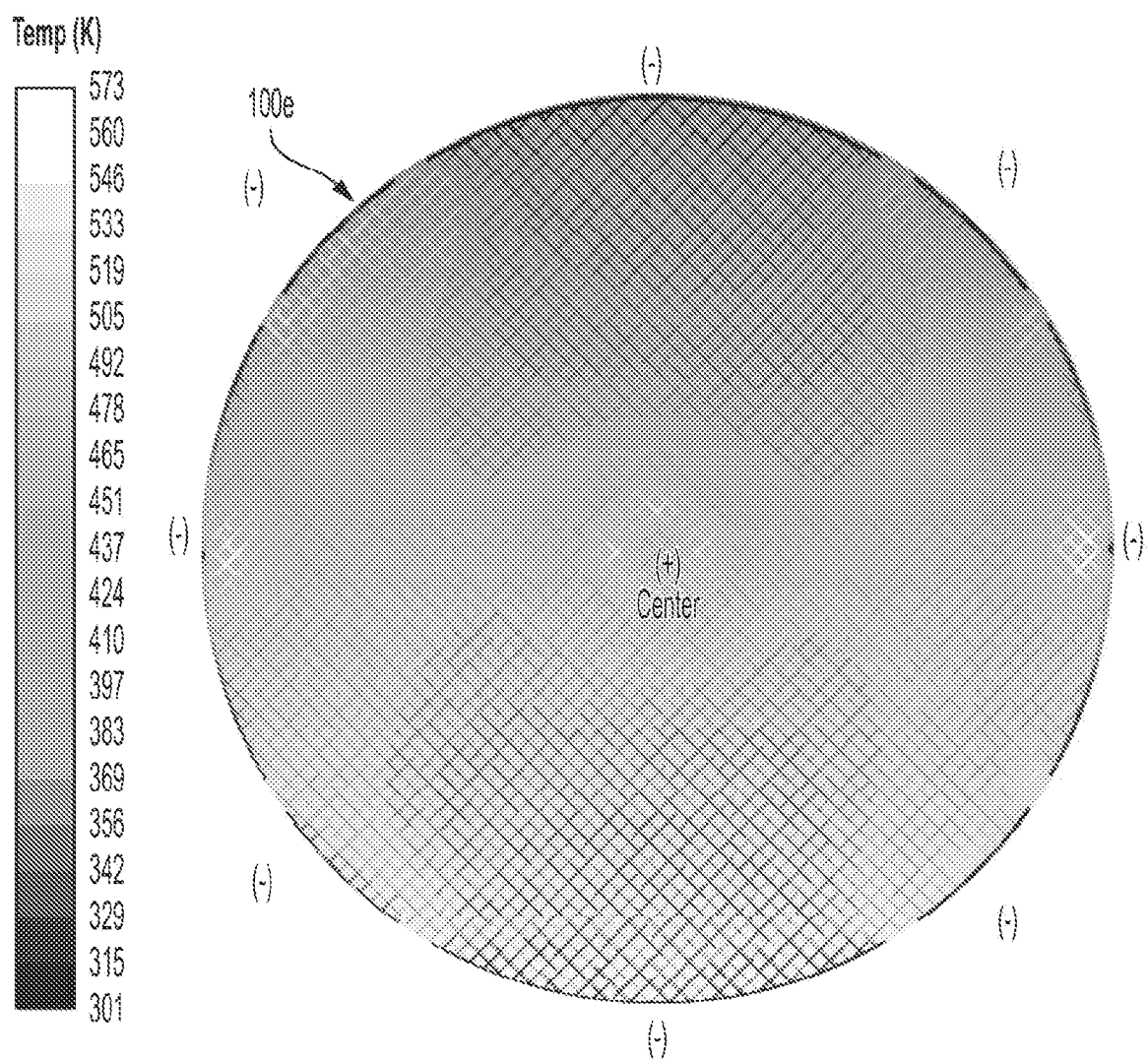
FIG. 8E depicts a heat profile of a heater for heating a catalyst, featuring multiple outer electrodes and an interior electrode, during a heating sequence, according to an example.
Figure 8F:
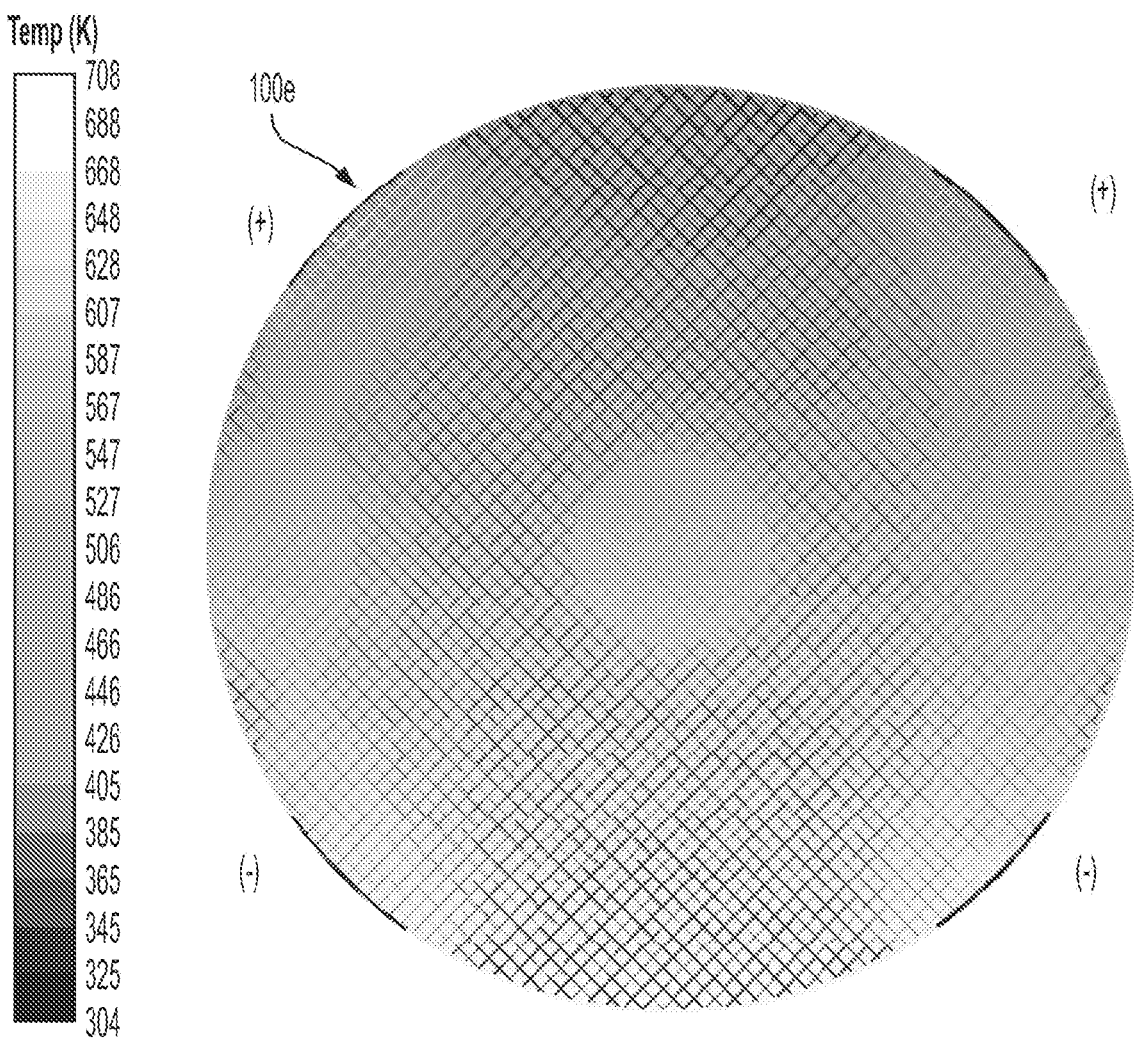
FIG. 8F depicts a heat profile of a heater for heating a catalyst, featuring multiple outer electrodes and an interior electrode, during a heating sequence, according to an example.
Figure 8G:
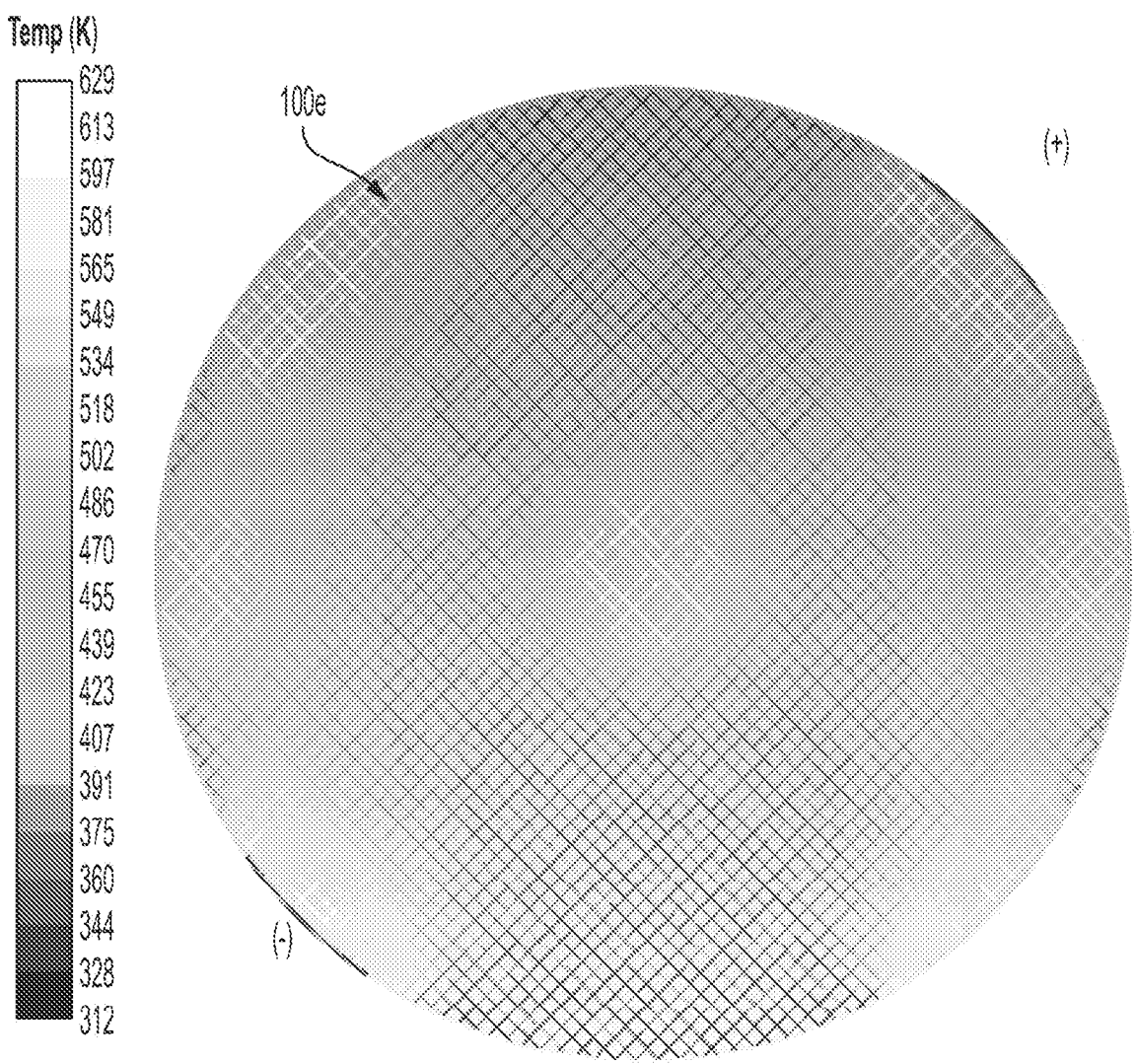
FIG. 8G depicts a heat profile of a heater for heating a catalyst, featuring multiple outer electrodes and an interior electrode, during a heating sequence, according to an example.
Figure 8H:
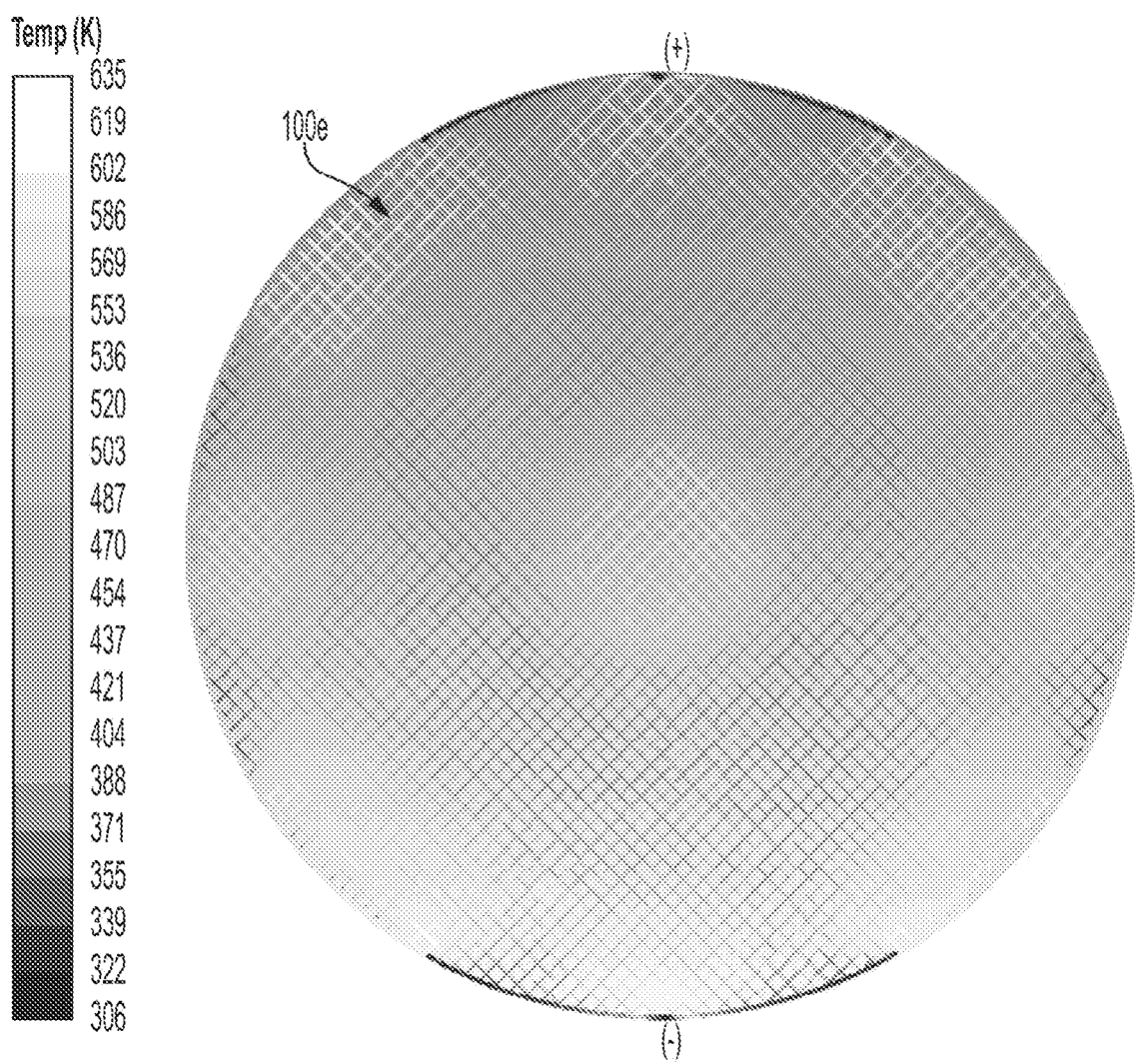
FIG. 8H depicts a heat profile of a heater for heating a catalyst, featuring multiple outer electrodes and an interior electrode, during a heating sequence, according to an example.
Figure 8I:
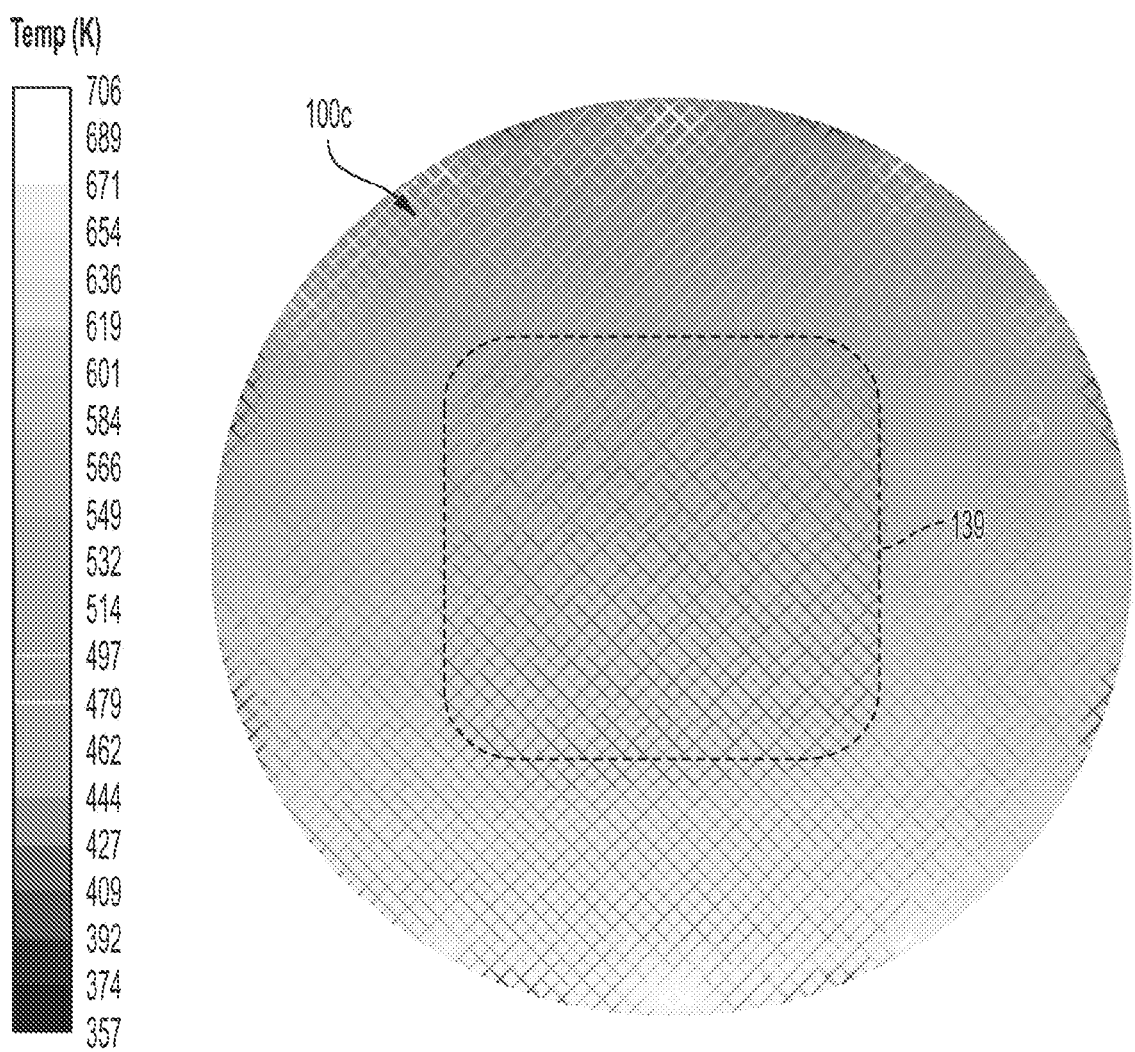
FIG. 8I depicts a heat profile of a heater for heating a catalyst, featuring multiple outer electrodes without an interior electrode, during a heating sequence, according to an example.

FIG. 8I illustrates an example temperature map resulting from the same heating sequence described with respect to FIGS. 8A-8H but without the interior electrode 126 or any step involving the interior electrode 126. As a result, the example of FIG. 8I results in cooler region 139 (relative to the temperatures achieved at other locations), which is not present in the example of FIG. 8H, which includes the internal electrode 126. Thus, by comparison of FIGS. 8H (having the interior electrode 126) and 8I (having no interior electrode), it can be seen that the inclusion of an interior electrode can be useful to increase heat generated in the area located about the interior electrode 126 (e.g., in zone 128, shown in FIG. 5).

Figure 9:
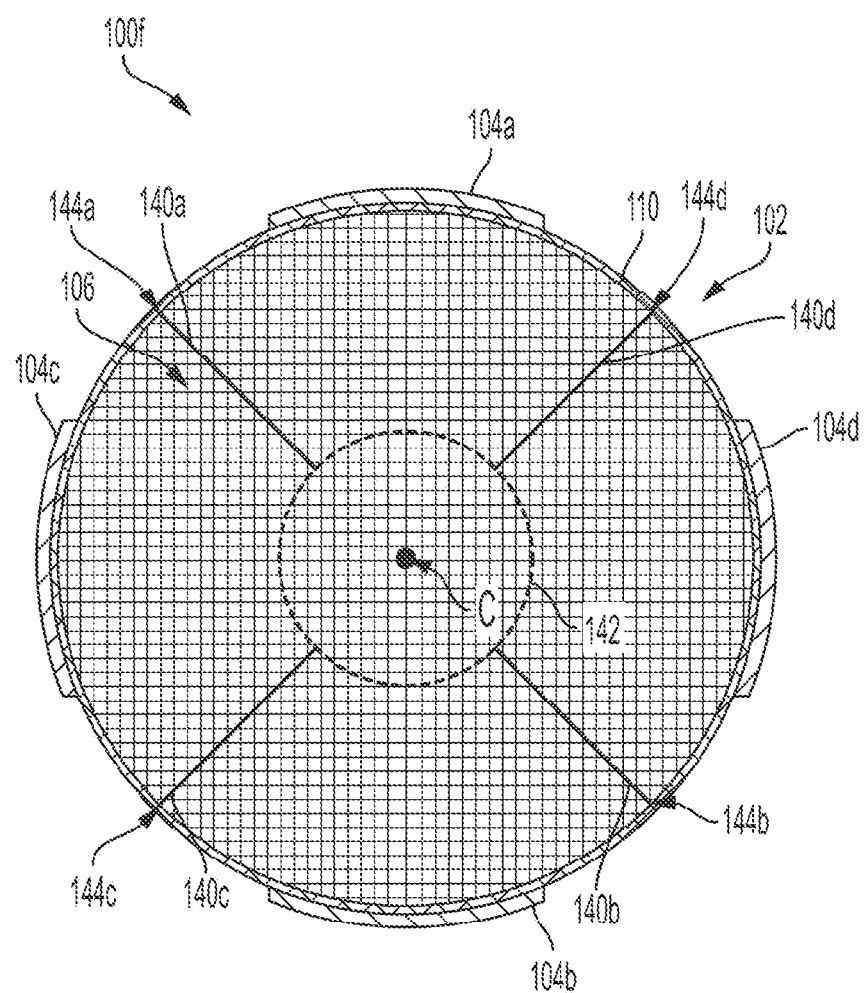
FIG. 9 depicts a cross-section of a heater for heating a catalyst, featuring multiple oppositely-disposed outer electrodes and multiple insulating layers, according to an example.

While several systems and methods described herein aim to provide a more uniform heating profile, in some embodiments the heater 100 is arranged to create one or more zones of increased temperature, such as by biasing or directing additional flows of current to a certain area. For example, some examples herein pertain to the use of interior electrodes 126 to create areas of increased current flow, and therefore, temperature generation. FIG. 9 shows a heater 100*f* according to another example, in which a plurality of electrically insulating layers 140, extending from an outer periphery of the honeycomb body 102 into the interior of the honeycomb structure 106, are arranged to funnel current toward certain regions of the honeycomb structure 106. In other words, current, which originates from the electrodes is prevented from traveling along current paths that are severed by the insulating layers 140, thereby concentrating the current produced by each electrode to a smaller number of total current paths in a smaller area of the heater 100.

By funneling current, the current density within an interior region or area 142 proximate to ends of the insulating layers is increased with respect to a similar heater 100 without the insulating layers 140. In addition, to the extent that a potential difference is applied between adjacent electrodes (e.g., electrodes 104*a* and 104*c*), the inclusion of insulating layers 140 (e.g., insulating layer 140*a*) disrupts the relatively short electrical path between adjacent electrodes 104, thus improving temperature uniformity of the heater 100*f*. In an example, the insulating layers can be formed as any suitable structure or gap that introduces an electrical discontinuity in the honeycomb structure 106. For example, insulating layers 140 can be slits (formed, e.g., by laser ablation, mechanical cutting, or any other suitable technique), cut into the honeycomb structure 106. In an alternative example, the slits can be filled with an insulating material such as a nonconductive ceramic, such as silicon carbide or cordierite, although other suitable insulating materials can be used, such as polymers.

Figure 10:
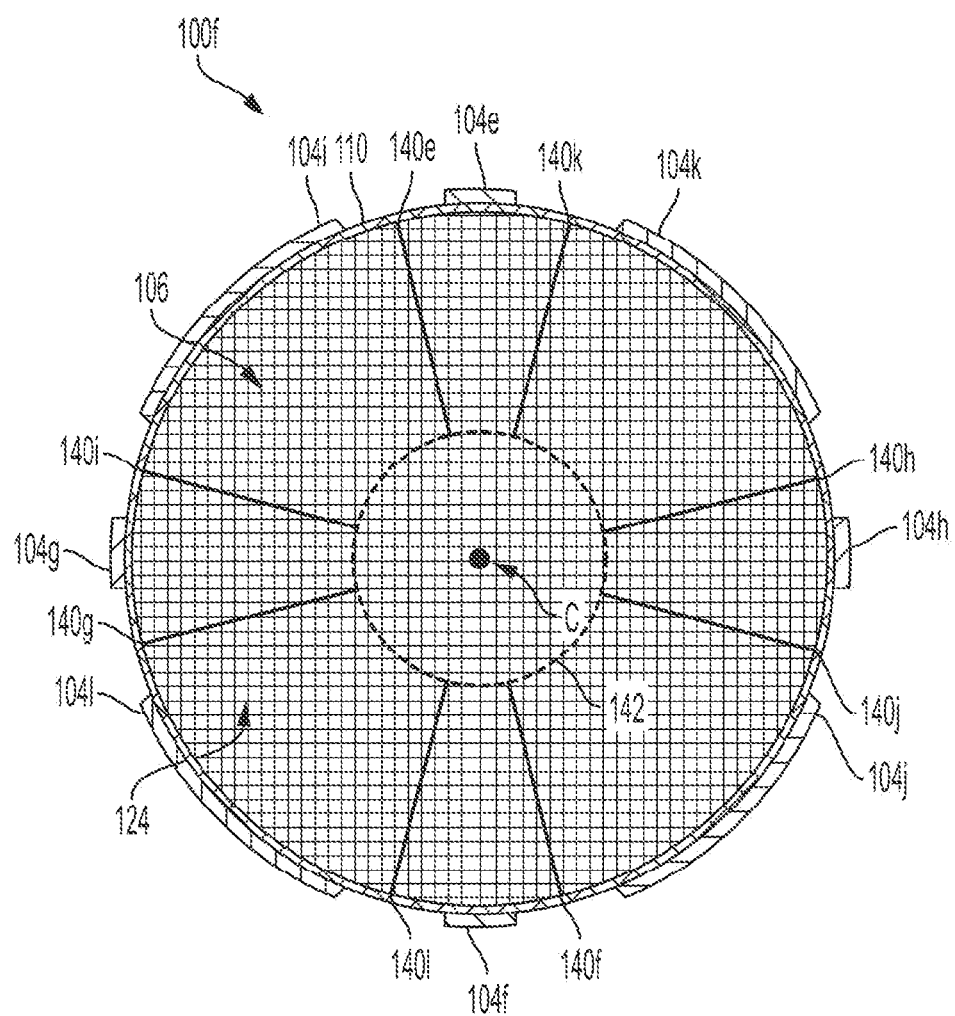
FIG. 10 depicts a cross-section of a heater for heating a catalyst, featuring multiple oppositely-disposed outer electrodes and multiple insulating layers, according to an example.

FIG. 10 depicts an example having four outer electrodes 1104*a*, 104*b*, 104*c*, and 104*d* arranged in two oppositely-disposed pairs. However, insulating layers 140 can be used in connection with a heater 100 having any number of outer electrodes 104. For example, insulating layers 140 can be used in conjunction with a heater having eight outer electrodes 104, as shown, for example, in FIG. 10.

As shown in FIGS. 9 and 10, an exterior end 144 (i.e., the end of insulating layers 140 positioned farthest from the central axis C) can extend to or through outer skin 110 at a position between adjacent electrodes 104. For example, as shown in FIG. 9, the exterior end 144*a* of insulating layer 140*a* is positioned between electrodes 104*a* and 104*c*. Alternatively, a given electrode 104 can extend over the exterior end 144 of a given insulating layer 140. For example, in some embodiments, electrode 104*a* extends over exterior end 144*a* of insulating layer 140, such that an axis extending longitudinally along insulating layer 140*a* would extend through electrode 104*a*.

To the extent that the insulating layers 140 are incorporated in a heater 100 having oppositely disposed outer electrodes 104 (and inner electrodes 126), a heating sequence configured to sequentially heat pairs of electrodes, as described herein, can be used. The inclusion of insulating layers 140 disposed between adjacent electrodes 104 can be used to ameliorate hot spots generated by applying a potential difference to the adjacent electrodes 104. Thus, heating sequences can comprise additional intervals, or longer intervals, in which a potential difference is applied between adjacent electrodes, without generating the undesirable hot spots therebetween.

The depth (e.g., radial distance into the honeycomb body 102) and/or angle (with respect the outer skin 110 and/or the center axis C) of the insulating layers 140 can be adjusted to heat a particular portion of the honeycomb body 102. Stated differently, the distance between interior ends 146 (i.e., those ends closer to the central axis C) of insulating layers 140 can be used to set the position for the localized area(s) of increased current density (with respect to the current density in the area surrounding the given localized area) within the honeycomb body 102. For example, in FIG. 11, the insulating layers 140 are disposed within the honeycomb body 102 asymmetrically (two of the insulating layers 140 are longer than the other two), in order to funnel current (increase current density) into a localized area positioned off the central axis C. For example, an off-center localized area of increased current, and thus heat, can be useful for exhaust treatments systems that are expected to receive a non-uniform and asymmetric flow of exhaust concentrated at the localized area.

Figure 11:
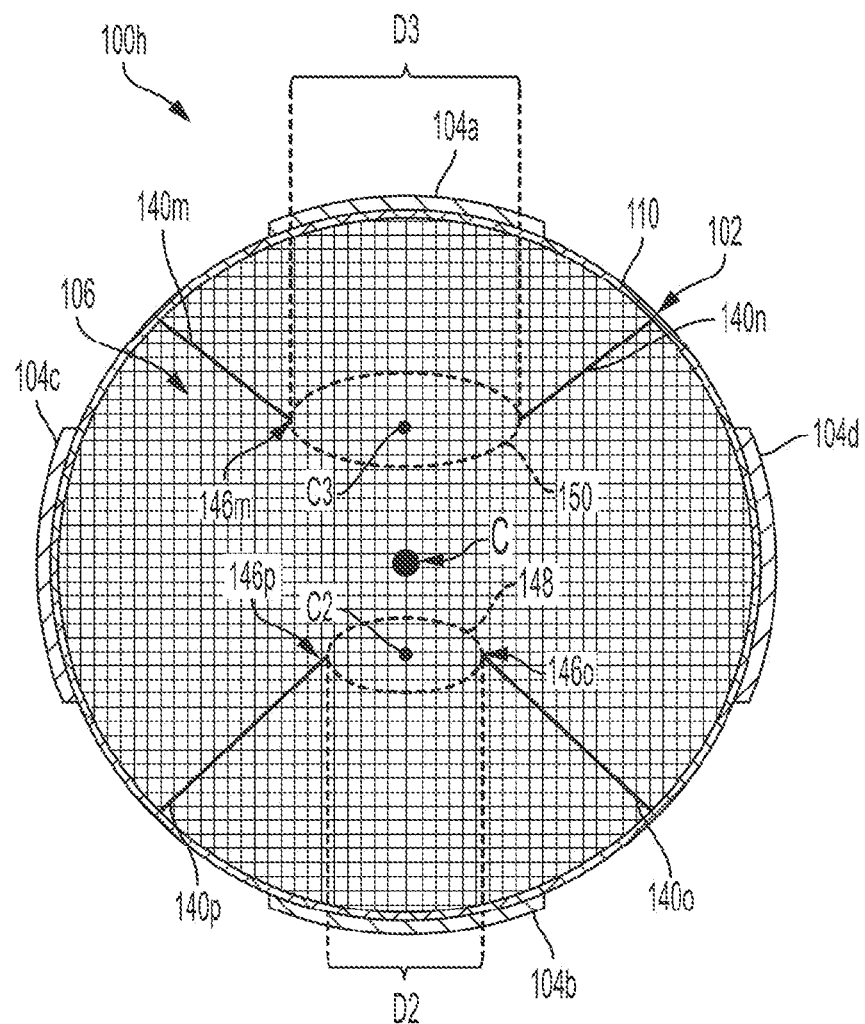
FIG. 11 depicts a cross-section of a heater for heating a catalyst, featuring multiple oppositely-disposed outer electrodes and multiple insulating layers, according to an example.
Figure 12:
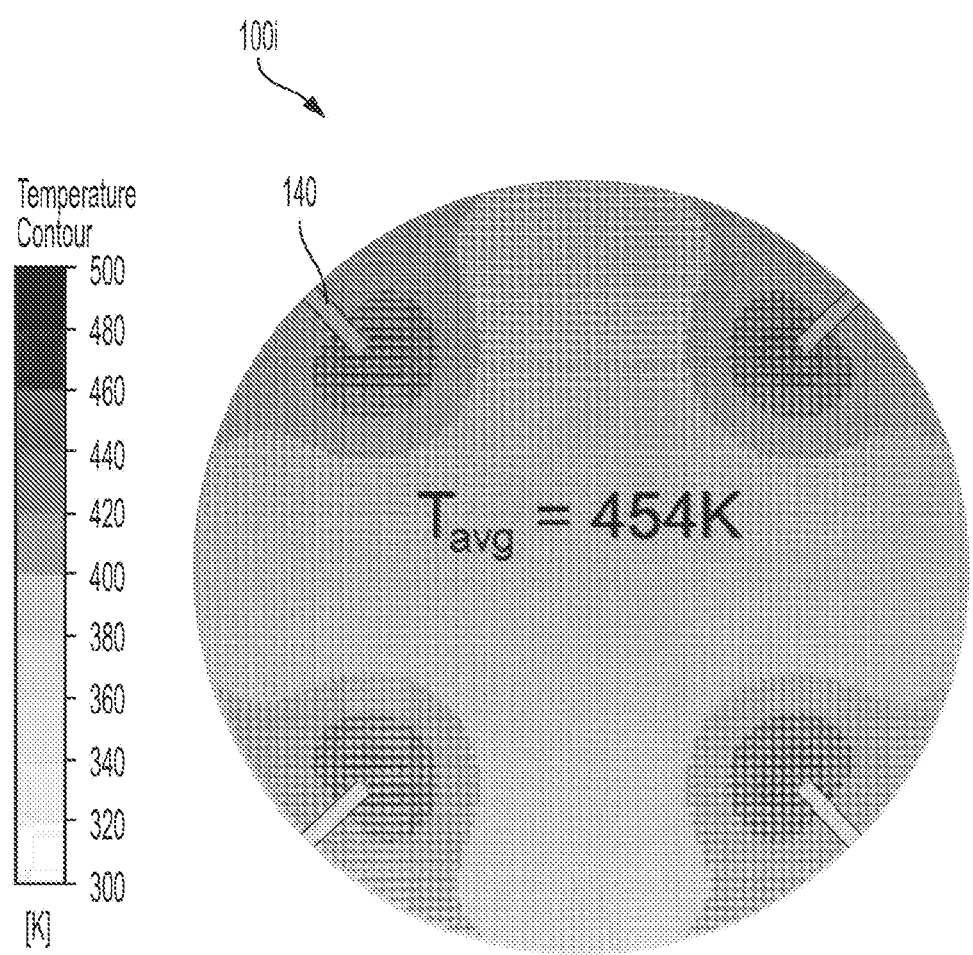
FIG. 12 depicts a heat profile of a heater for heating a catalyst, featuring multiple oppositely-disposed outer electrodes and multiple insulating layers, according to an example.
Figure 13:
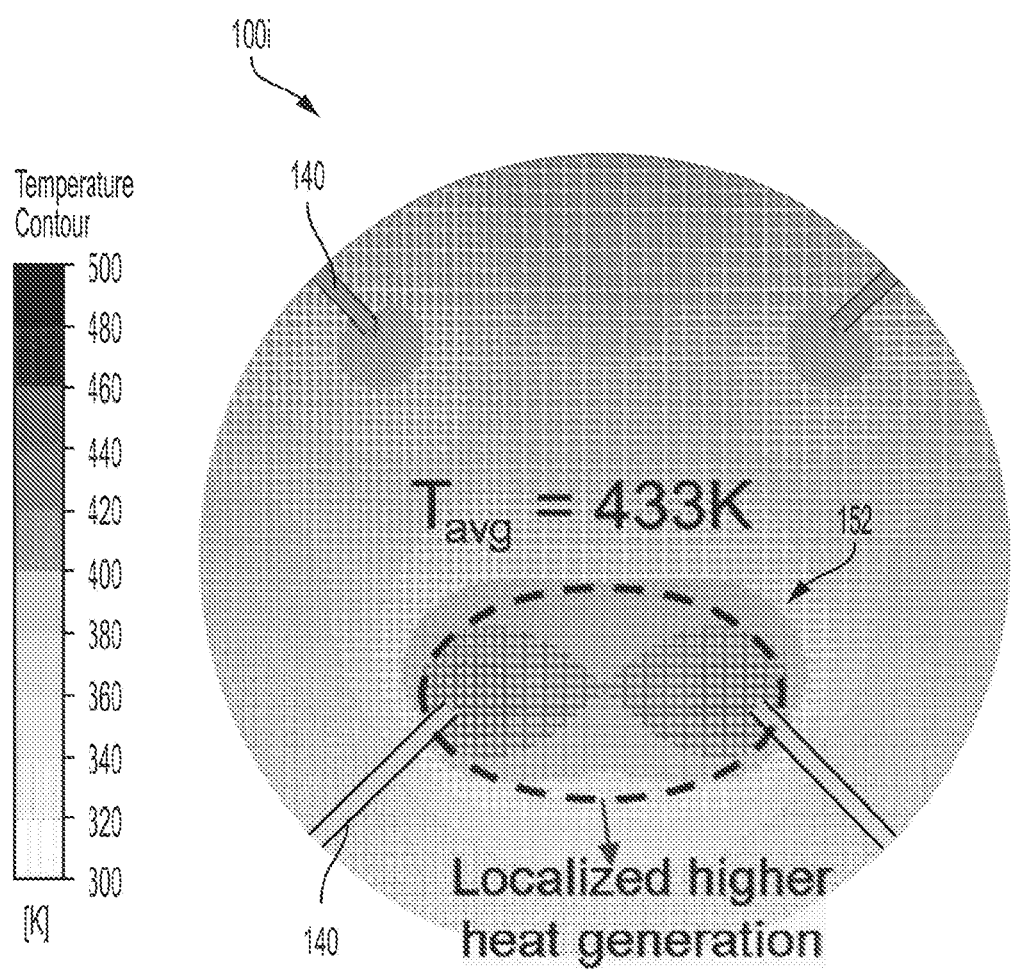
FIG. 13 depicts a heat profile of a heater for heating a catalyst, featuring multiple oppositely-disposed outer electrodes and multiple insulating layers, according to an example.

For example, as shown in FIG. 11, the distance between the interior ends 146 of insulating layers 140$o$ and 140$p$, denoted as D2, is smaller than, for comparison, the distance between the interior ends 146$m$, 146$n$ of insulating layers 140$m$, 140$n$, denoted as D3. As a result, the current density in a first interior region or area 148 (centered at point C2) between the interior ends 146$o$, 146$p$ of insulating layers 140$o$, 140$p$ is higher than the current density in a second area 150 (centered at point C3) between the interior ends 146$m$, 146$n$ of insulating layers 140$m$, 140$n$. The heat generated in the first area 148 will thus be higher than the second area 150. This can be seen, for example, in FIGS. 12 and 13, which demonstrate the heat profile of an example heater 100$i$ with symmetric insulting layers 140 (similar to the heater 100$f$ shown in FIG. 9), and the heat profile of an example heater 100$j$ with asymmetric insulating layers 140 (similar to heater 100$h$ shown in FIG. 11). As a result, the current density in a region 152 in FIG. 13 is higher, as a result of the narrow gap between the insulating layers in FIG. 13, than the current density in the comparable area of FIG. 12.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples can be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An electrical heater, comprising:
a honeycomb body having a central axis extending longitudinally therethrough, the honeycomb body comprising a matrix of intersecting walls forming a plurality of cells extending axially through the honeycomb body;
a plurality of electrodes positioned about an outer periphery of the honeycomb body, the plurality of electrodes being arranged into a plurality of pairs of electrodes that comprises at least a first pair of electrodes and a second pair of electrodes, each pair of electrodes comprising a first electrode and a second electrode, wherein a current produced by the electrodes of each pair flows through at least some of the intersecting walls between the electrodes of each pair of electrodes;
wherein an electrode length of the electrodes of each pair of electrodes, measured along the outer periphery in a cross-sectional plane perpendicular to the central axis, is proportional to a central current path length defined as the shortest distance, through the walls, between center points of the electrodes of that pair of electrodes, and wherein the electrode length of the electrodes of the first pair of electrodes is different than the electrode length of the electrodes of the second pair of electrodes.

2. The electrical heater of claim 1, further comprising a plurality of insulating layers, each insulating layer extending from the outer periphery of the honeycomb body into an interior of the honeycomb body, such that current is concentrated into an interior region of the honeycomb body.

3. The electrical heater of claim 2, wherein each insulating layer extends radially toward the central axis from the outer peripherally at a location between each circumferentially adjacent pair of the electrodes.

4. A system comprising the electrical heater of claim 1 and an exhaust treatment device.

5. The system of claim 4, wherein the intersecting walls of the electrical heater carry a catalytic material.

6. An electrical heater comprising:
a honeycomb body having a central axis extending longitudinally therethrough, the honeycomb body comprising a matrix of intersecting walls forming a plurality of cells extending axially through the honeycomb body;
a plurality of electrodes positioned about an outer periphery of the honeycomb body, the plurality of electrodes being arranged into a plurality of pairs of electrodes that comprises at least a first pair of electrodes and a second pair of electrodes, each pair of electrodes comprising a first electrode and a second electrode, wherein a current produced by the electrodes of each pair flows through at least some of the intersecting walls between the electrodes of each pair of electrodes; and
a controller configured to apply a voltage between the plurality of electrodes according to a heating sequence, wherein the heating sequence comprises sequentially applying a first voltage to the first pair of electrodes and a second voltage between the second pair of electrodes, wherein an electrode length of the electrodes of each pair of electrodes along the outer periphery is proportional to a central current path length defined as the shortest distance, through the walls, between center points of the electrodes of that pair of electrodes, and wherein the electrode length of the electrodes of the first pair of electrodes is different than the electrode length of the electrodes of the second pair of electrodes.

7. The electrical heater of claim 6, wherein an average of the second voltage over the heating sequence is different than an average of the first voltage over the heating sequence.

8. The electrical heater of claim 6, further comprising:
an interior electrode embedded within the honeycomb body, wherein the heating sequence further comprises applying a voltage between the interior electrode and at least one of the plurality of electrodes.

9. An electrical heater comprising:
a honeycomb body being substantially cylindrical and having a central axis extending longitudinally therethrough, the honeycomb body comprising a matrix of intersecting walls;
a plurality of electrodes being operatively positioned about an outer periphery of the honeycomb body, the plurality of electrodes being arranged into a plurality of oppositely disposed pairs of electrodes, such that at least a portion of a current induced between the electrodes of each oppositely disposed pair will flow through the central axis; and
a controller configured to apply a voltage between each oppositely-disposed pair of electrodes according to a heating sequence, wherein the heating sequence comprises sequentially applying a first voltage between a first oppositely-disposed pair of the oppositely-disposed pairs of electrodes and a second voltage between a second oppositely-disposed pair of the oppositely-disposed pairs of electrodes, wherein a first average of the first voltage during the heating sequence is proportional to a first current length of a first central current path between centers of the electrodes of the first oppositely-disposed pair, wherein a second average of the second voltage during the heating sequence is proportional to a second current length of a second central current path between centers of the electrodes of the second oppositely-disposed pair, and wherein the first current path is longer than the second current path; and
an interior electrode embedded within the honeycomb body, wherein the heating sequence further comprises applying a voltage between the interior electrode and at least one of the plurality of electrodes.

10. A method for heating a catalyst, comprising:
applying a first voltage between a first pair of electrodes and a second voltage between a second pair of electrodes, wherein the electrodes of the first and second pairs of electrodes are disposed about an outer periphery of a honeycomb body having a central axis extending longitudinally therethrough, and the honeycomb body comprising a matrix of intersecting walls forming a plurality of cells extending axially through the honeycomb body;
wherein an electrode length of each of the electrodes of each pair of electrodes along the outer periphery is proportional to a central current path length defined as the shortest distance, through the walls, between center points of the electrodes of that pair of electrodes, and wherein the electrode length of the electrodes of the first pair of electrodes is different than the electrode length of the electrodes of the second pair of electrodes,
wherein applying the first voltage and the second voltage comprises sequentially applying the first voltage to the first pair of electrodes and the second voltage between the second pair of electrodes according to a heating sequence.

11. The method of claim 10, wherein an average of the second voltage over the heating sequence is different than an average of the first voltage over the heating sequence.

12. The method of claim 10, further comprising generating a substantially uniform heat profile across an end face of the honeycomb body with the heating sequence.

13. The method of claim 10, wherein the heating sequence comprises a cooling interval disposed between applications of the first voltage between the first pair of electrodes and the second voltage between the second pair of electrodes.

14. The method of claim 10, further comprising concentrating current at an interior region that is spaced away from the outer periphery of the honeycomb body.

15. The method of claim 14, wherein the honeycomb body comprises a plurality of electrically insulating layers that prevent current flow through sections of the walls severed by the insulating layers to concentrate the current at the interior region.

16. The method of claim 14, wherein the honeycomb body comprises an interior electrode located proximate to the interior region and the method further comprises applying a voltage between the interior electrode and one of the electrodes of the first or second pairs of electrodes.

* * * * *